US012727728B2

(12) United States Patent
Tian et al.

(10) Patent No.: US 12,727,728 B2
(45) Date of Patent: Sep. 8, 2026

(54) METHOD FOR CONTROLLING ROTATING SPEED, CLEANING ROBOT, AND STORAGE MEDIUM

(71) Applicant: Qfeeltech (Beijing) Co., Ltd., Beijing (CN)

(72) Inventors: Wulin Tian, Beijing (CN); Yafei Shen, Beijing (CN)

(73) Assignee: Qfeeltech (Beijing) Co., Ltd., Beijing (CN)

( * ) Notice: Subject to any disclaimer, the term of this patent is extended or adjusted under 35 U.S.C. 154(b) by 165 days.

(21) Appl. No.: 18/478,976

(22) Filed: Sep. 29, 2023

(65) Prior Publication Data

US 2024/0023780 A1 Jan. 25, 2024

Related U.S. Application Data

(63) Continuation of application No. PCT/CN2022/084867, filed on Apr. 1, 2022.

(30) Foreign Application Priority Data

Apr. 2, 2021 (CN) ......................... 202110363475.7
Apr. 2, 2021 (CN) ......................... 202120687889.0

(51) Int. Cl.
*A47L 11/40* (2006.01)
*A46B 13/02* (2006.01)
(Continued)

(52) U.S. Cl.
CPC ........... *A47L 11/4011* (2013.01); *A46B 13/02* (2013.01); *A47L 11/4036* (2013.01);
(Continued)

(58) Field of Classification Search
CPC .................................................. A47L 11/4011
See application file for complete search history.

(56) References Cited

U.S. PATENT DOCUMENTS

2006/0076035 A1* 4/2006 McGee ............... A47L 11/4069 15/52.1
2009/0133213 A1 5/2009 Pineschi et al.

FOREIGN PATENT DOCUMENTS

CN 1295367 A 5/2001
CN 101569072 A 10/2009
(Continued)

OTHER PUBLICATIONS

Machine translation: CN109645892; Wang et al. (Year: 2019).*
(Continued)

*Primary Examiner* — Natasha N Campbell
(74) *Attorney, Agent, or Firm* — Alleman Hall LLP

(57) ABSTRACT

The present disclosure provides a method for controlling a rotating speed, a cleaning robot, and a storage medium. The method includes: obtaining the rotating speed of the main brush when the main brush cleans a surface-to-be-cleaned; comparing the rotating speed of the main brush with a predetermined rotating speed; decreasing the rotating speed when the rotating speed is greater than the predetermined rotating speed; or, increasing the rotating speed when the rotating speed is less than the predetermined rotating speed. As such, over-load of an electric motor of the main brush can be avoided, thereby extending the service life of the electric motor. In the meantime, the power consumption by the cleaning robot can be reduced, thereby extending the operation time of the cleaning robot. Furthermore, a satisfying cleaning effect of the cleaning robot can be maintained.

15 Claims, 18 Drawing Sheets

(51) Int. Cl.
*G01D 5/244* (2006.01)
*G01D 5/26* (2006.01)

(52) U.S. Cl.
CPC ....... *A47L 11/4066* (2013.01); *A47L 11/4069* (2013.01); *A47L 11/4072* (2013.01); *G01D 5/244* (2013.01); *G01D 5/26* (2013.01); *A46B 2200/3033* (2013.01); *A47L 2201/04* (2013.01); *A47L 2201/06* (2013.01)

(56) References Cited

FOREIGN PATENT DOCUMENTS

| | | | | | |
|---|---|---|---|---|---|
| CN | 102652654 | A | | 9/2012 | |
| CN | 103315679 | A | | 9/2013 | |
| CN | 103872648 | A | | 6/2014 | |
| CN | 104248397 | A | | 12/2014 | |
| CN | 105796008 | A | | 7/2016 | |
| CN | 106137042 | A | | 11/2016 | |
| CN | 106655978 | A | | 5/2017 | |
| CN | 107550401 | A | | 1/2018 | |
| CN | 107947117 | A | | 4/2018 | |
| CN | 108013838 | A | | 5/2018 | |
| CN | 109235337 | A | | 1/2019 | |
| CN | 109322266 | A | | 2/2019 | |
| CN | 109363580 | A | | 2/2019 | |
| CN | 109645892 | A | * | 4/2019 | .......... A47L 11/4061 |
| CN | 208740865 | U | | 4/2019 | |
| CN | 109846425 | A | | 6/2019 | |
| CN | 110123210 | A | | 8/2019 | |
| CN | 110367877 | A | | 10/2019 | |
| CN | 110601141 | A | | 12/2019 | |
| CN | 112034753 | A | | 12/2020 | |
| CN | 112137502 | A | | 12/2020 | |
| CN | 215128073 | U | | 12/2021 | |
| DE | 102015100483 | A1 | | 7/2016 | |
| JP | 08517 | A | | 1/1996 | |
| JP | 2000217753 | A | | 8/2000 | |
| WO | 2016047183 | A1 | | 3/2016 | |

OTHER PUBLICATIONS

First Office Action issued on Apr. 26, 2023, in Chinese Patent Application No. 202110363475.7 and English machine translation (23 pages).

Second Office Action issued on Jul. 3, 2023, in Chinese Patent Application No. 202110363475.7 and English machine translation (27 pages).

Third Office Action issued on Oct. 11, 2023, in Chinese Patent Application No. 202110363475.7 and English machine translation (29 pages).

International Search Report and Written Opinion dated Jul. 1, 2022, issued in PCT/CN2022/084867, filed on Apr. 1, 2022, and their English machine translations (15 pages).

Decision of Rejection (Oppose to reply) mailed on Nov. 30, 2023, in Chinese Patent Application No. 202110363475.7, and English machine translation (22 pages).

* cited by examiner

METHOD FOR CONTROLLING ROTATING SPEED, CLEANING ROBOT, AND STORAGE MEDIUM

CROSS-REFERENCE TO RELATED APPLICATIONS

This application is a continuation of International Application No. PCT/CN2022/084867, filed on Apr. 1, 2022, which claims priority to Chinese Patent Application No. 202110363475.7, filed in Chinese Patent Office on Apr. 2, 2021, and to Chinese Patent Application No. 202120687889.0, filed in Chinese Patent Office on Apr. 2, 2021. The entire content of the above-referenced applications is incorporated herein by reference in this application.

TECHNICAL FIELD

The present disclosure generally relates to the technical field of smart home and, in particular, to a method for controlling a rotating speed, a cleaning robot, and a storage medium.

BACKGROUND

In related technologies, a cleaning robot, such as a smart floor sweeping robot, a smart floor mopping robot, and a window cleaning robot, etc., may be configured to clean an area corresponding to the moving trajectory of the cleaning robot. Specifically, a cleaning unit of the cleaning robot may clean the area. The cleaning unit may include components configured for cleaning, such as a main brush.

However, due to certain factors (e.g., the cleaning robot having moved to an area/location to be cleaned where the friction is greater, the amount of dust being present on the surface-to-be-cleaned being excessively large, or the main brush being tangled with objects such as fabric threads and hair), the rotating speed of the main brush may change (e.g., the rotating speed of the main brush may be reduced due to the above-mentioned factors). The changed rotating speed of the main brush may not satisfy the cleaning needs of the cleaning robot (e.g., the rotating speed of the main brush being overly slow may result in a degradation in the cleaning effect for the area-to-be-cleaned and/or extension of the time needed to clean the area-to-be-cleaned).

SUMMARY OF DISCLOSURE

In light of the above, the present disclosure provides a method for controlling a rotating speed, a cleaning robot, a main brush assembly, and a storage medium.

According to a first aspect of the present disclosure, a method for controlling a rotating speed of a main brush of a cleaning robot is provided. The method includes: obtaining the rotating speed of the main brush when the main brush cleans a surface-to-be-cleaned; comparing the rotating speed of the main brush with a predetermined rotating speed; decreasing the rotating speed of the main brush when the rotating speed of the main brush is greater than the predetermined rotating speed; or, increasing the rotating speed of the main brush when the rotating speed is less than the predetermined rotating speed.

According to a second aspect of the present disclosure, a cleaning robot is provided. The cleaning robot includes: a motion device configured to move the cleaning robot on a surface-to-be-cleaned; a main brush configured to clean the surface-to-be-cleaned; a sensing device configured to obtain a rotating speed of the main brush; and a controller configured to decrease the rotating speed of the main brush when the rotating speed of the main brush is greater than a predetermined rotating speed, or increase the rotating speed of the main brush when the rotating speed of the main brush is less than the predetermined rotating speed.

According to a third aspect of the present disclosure, a main brush assembly for a cleaning robot is provided. The main brush assembly includes: a main brush configured to clean a surface-to-be-cleaned; a main brush electric motor connected with the main brush and configured to drive the main brush to rotate; a main brush electric motor driver connected with the main brush motor and configured to drive the main brush motor; an encoder disposed at the main brush electric motor and configured to monitor a rotating speed of the main brush, and to transmit a feedback signal including the rotating speed of the main brush to a processor; and the process configured to be electrically connected with the encoder and the main brush electric motor driver, to receive the feedback signal from the encoder, and to output an instruction signal to the main brush electric motor driver, wherein the main brush electric motor driver is also configured to adjust a rotating speed of the main brush electric motor based on the instruction signal.

According to a fourth aspect of the present disclosure, a cleaning robot is provided. The cleaning robot includes: a housing; a motion device configured to move the cleaning robot on a surface-to-be-cleaned; and the above-described main brush assembly disposed at a bottom portion of the cleaning robot, wherein the cleaning robot moves on the surface-to-be-cleaned through the motion device and cleans the surface-to-be-cleaned through the main brush assembly.

According to a fifth aspect of the present disclosure, a non-transitory computer-readable storage medium is provided. The non-transitory computer-readable storage medium stores computer-executable program instructions. When the computer-executable program instructions are executed by a processor, the processor causes a cleaning robot to perform the above-described method for controlling the rotating speed of a main brush of the cleaning robot.

According to the present disclosure, when the obtained rotating speed of the main brush is greater than the predetermined rotating speed, the rotating speed of the main brush is decreased. As such, over-load of the electric motor of the main brush can be avoided, thereby extending the service life of the electric motor. In the meantime, power consumption of the cleaning robot is reduced, thereby increasing the operation time of the cleaning robot. Alternatively, when the rotating speed of the main brush is less than the predetermined rotating speed, the rotating speed of the main brush is increased. As such, the same cleaning effect can be maintained by maintaining the rotating speed of the main brush at the predetermined rotating speed. Therefore, overload of the electric motor can be avoided, thereby extending the service life of the electric motor. In the meantime, power consumption of the cleaning robot can be reduced, thereby increasing the operation time of the cleaning robot. Furthermore, the cleaning effect of the cleaning robot can be maintained to satisfy the cleaning needs of the cleaning robot.

According to the present disclosure, the encoder monitors the rotating speed of the main brush and transmits a feedback signal including the rotating speed of the main brush to the processor. The processor receives the feedback signal from the encoder and transmits an instruction signal to the main brush electric motor driver. The main brush electric motor driver receives the instruction signal from the processor and adjusts the rotating speed of the main brush electric motor. As such, cleaning effect of the cleaning robot can be maintained to satisfy the cleaning needs of the cleaning robot. Furthermore, power consumption of the cleaning robot can be reduced, thereby increasing the operation time of the cleaning robot.

Based on detailed descriptions of the example embodiments of the present disclosure with reference to the accompanying drawings, other features and aspects of the present disclosure will become clear.

BRIEF DESCRIPTIONS OF THE DRAWINGS

The drawings, which are included in the specification and constitute parts of the specification, along with the specification, illustrate example embodiments, features, and aspects of the present disclosure, and are used to explain the principle of the present disclosure.

DETAILED DESCRIPTION

Figure 1A:
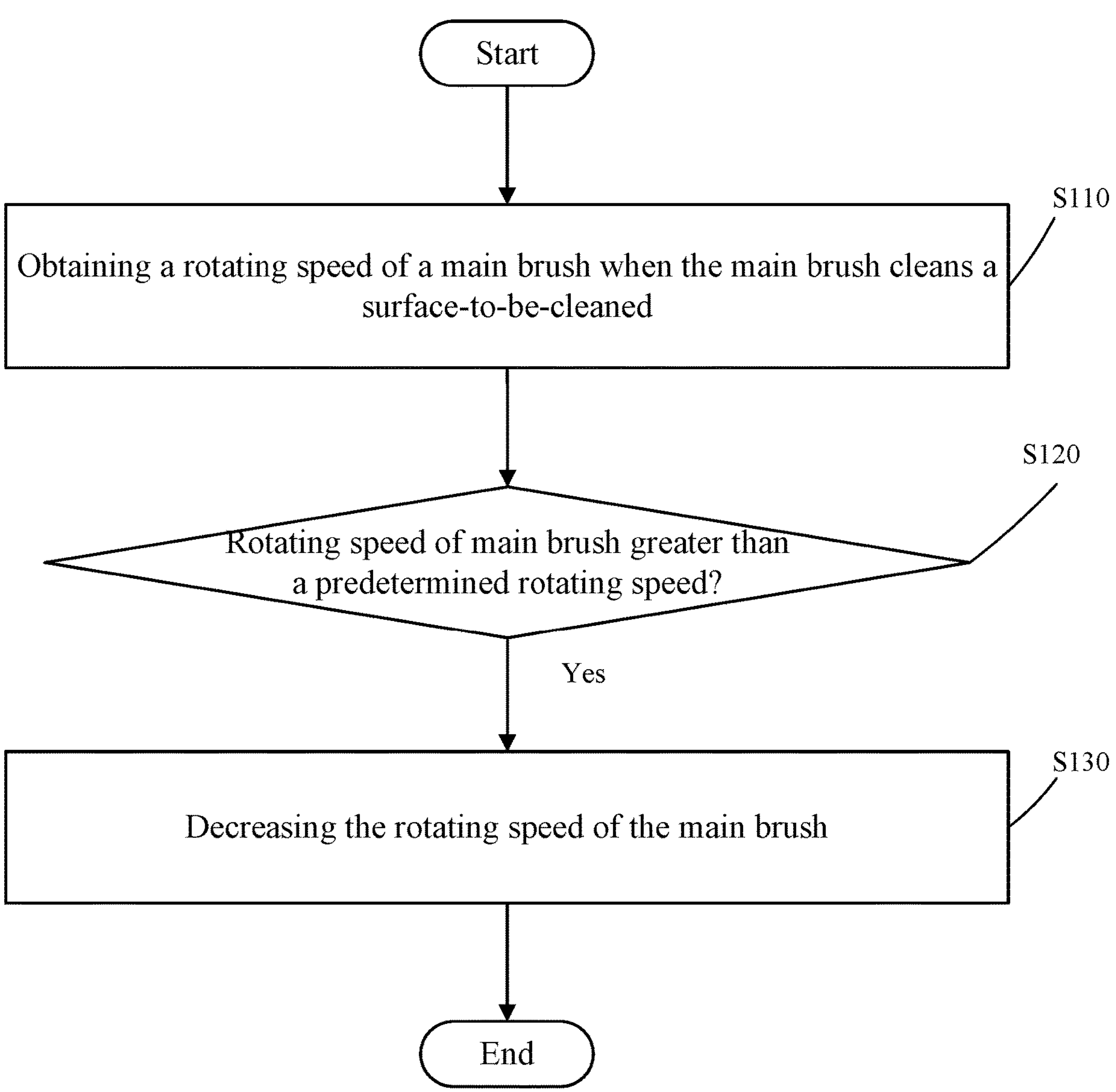
FIGS. 1A and 1B illustrate example flowcharts showing methods for controlling the rotating speed of the main brush of a cleaning robot, according to illustrative embodiments of the present disclosure.

Various illustrative embodiments, features, and aspects of the present disclosure will be described in detail with reference to the drawings. The same labels in the drawings indicate elements having the same or similar functions. Although various aspects of the embodiments are shown in the drawings, the drawings are not to scale, unless otherwise noted.

The term "illustrative" as used herein means "as an example, an embodiment, or explanatory." Here, any embodiment described using the term "illustrative" does not necessarily mean that the embodiment is more advantageous or better than other embodiments.

In addition, to better explain the present disclosure, various specific details are described in the following detailed implementations. A person having ordinary skills in the art would understand that without certain specific details, the present disclosure can still be implemented. In some embodiments, methods, means, elements, and electric circuits that are well-known to a person having ordinary skills in the art are not described in detail, such that the main principle of the present disclosure can be better illustrated.

Cleaning robots may be devices that are configured to autonomously move in a space of an actual work zone to clean trash (e.g., dust, dirty water, etc.) on a floor or a window, thereby autonomously cleaning the space. Cleaning robots include, but are not limited to, smart floor sweeping robots, smart floor mopping robots, and window cleaning robots. The space of the actual work zone of a cleaning robot may be a closed space formed by a plurality of rooms, or may be an open space such as an outdoor space. In other words, the cleaning robot may be used to clean an indoor space of a home to be cleaned, and may be used to clean an outdoor space to be cleaned, such as a floor/ground of a public square.

Figure 1B:
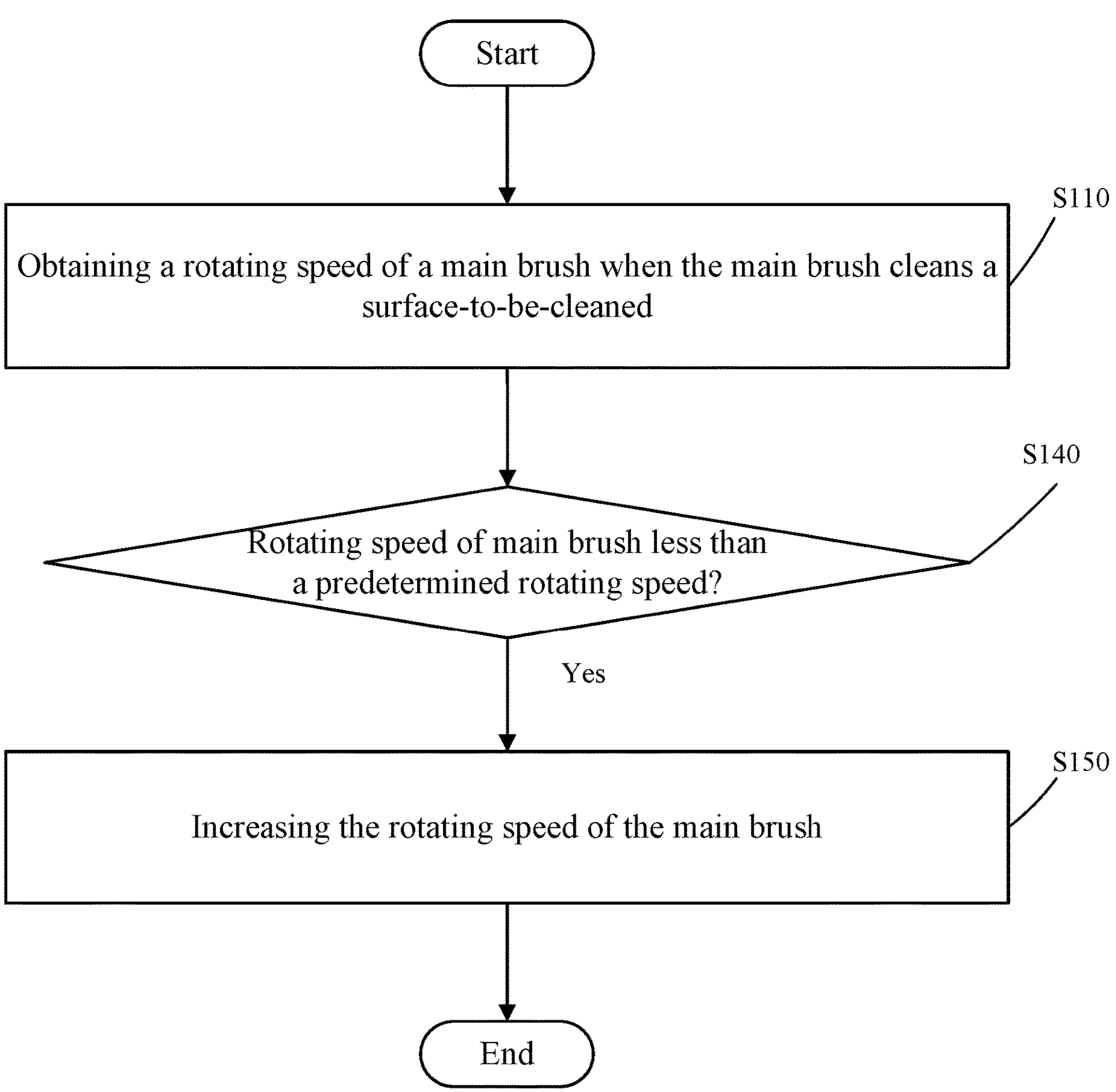

FIGS. 1A and 1B illustrate flowcharts showing methods for controlling the rotating speed of the main brush of the cleaning robot, according to illustrative embodiments. The method for controlling the rotating speed of the main brush may be executed by the cleaning robot. For example, the method for controlling the rotating speed may be executed by a controller of the cleaning robot. For convenience of descriptions, in the following descriptions, the method for controlling the rotating speed is described as being executed by the controller of the cleaning robot. It should be understood that the method for controlling the rotating speed may be executed by other components of the cleaning robot, as long as the components have the capability of executing the method for controlling the rotating speed.

During the process of the main brush cleaning the surface-to-be-cleaned, for certain reasons, the rotating speed of the main brush (also referred to as the main brush rotating speed) may increase. Under this circumstance, although the cleaning effect can be maintained, the power consumption of the cleaning robot is increased unnecessarily, which may shorten the operation time of the cleaning robot. The reasons may include, but not be limited to: increase in the power of the electric motor of the main brush, increase of the smoothness of the surface-to-be-cleaned, decrease in the amount of dust on the surface-to-be-cleaned, or the material of the surface-to-be-cleaned being changed to a material that has a smaller friction/resistance.

To address this issue, the method for controlling the rotating speed of the main brush as shown in FIG. 1A is provided. Referring to FIG. 1A, the method for controlling the rotating speed according to the illustrative embodiment may include the following steps:

Step S110, obtaining the rotating speed of the main brush when the main brush cleans the surface-to-be-cleaned.

In the illustrative embodiment, the cleaning robot may move on the surface-to-be-cleaned, and may clean the surface-to-be-cleaned using the main brush. As described above, during the process of the main brush cleaning the surface-to-be-cleaned, due to the above reasons, the rotating speed of the main brush may increase and cause the above-described issues. As such, when the main brush cleans the surface-to-be-cleaned, the controller may obtain the rotating speed of the main brush. It should be understood that in some embodiments, the controller may obtain the rotating speed of the main brush in real time and continuously. Other methods may also be used to obtain the rotating speed. For example, the controller may obtain the rotating speed of the main brush according to an interval of a pre-set time period.

In one implementation, the controller may obtain the rotating speed of the main brush through a component configured to obtain the rotating speed of the main brush. The component configured to obtain the rotating speed of the main brush may include, but not be limited to, a sensing device configured to obtain the rotating speed. For example, the sensing device may be an encoder.

In one implementation, the encoder configured to obtain the rotating speed may be an opto-electric encoder. In some embodiments, the opto-electric encoder may obtain the rotating speed of the main brush. The opto-electric encoder may transmit the obtained rotating speed of the main brush to the controller. The opto-electric encoder may be an E6B2-CWZ6C opto-electric rotary incremental encoder.

In one implementation, the encoder configured to obtain the rotating speed may be a magnetic encoder. In some embodiments, the magnetic encoder may obtain the rotating speed of the main brush, and transmit the obtained rotating speed of the main brush to the controller.

The magnetic encoder may include an encoder magnetic disk, an encoder shaft, and a Hall sensor. The encoder magnetic disk may be formed by a plurality of alternately arranged N/S poles (where N represents the north pole of the magnetic field, and S represents the south pole of the magnetic field). The encoder shaft may coaxially rotate with the shaft of the electric motor of the main brush, such that the encoder magnetic disk may rotate. The Hall sensor may output a pulse signal corresponding to the rotating speed of the main brush. The pulse signal may include multiple pulses of high voltage and low voltage. The present embodiment does not limit the placement of the encoder. In some embodiments, the encoder may not be coaxial with the electric motor. For example, a belt may be used to make the shaft of the electric motor and the shaft of the encoder to be parallel with one another. Alternatively, through a worm wheel and worm gear mechanism or a bevel gear, the shaft of the electric motor and the shaft of the encoder may form a predetermined angle. The above methods can all enable the encoder to monitor the rotating speed of the main brush. Therefore, the present disclosure does not limit the relative positions of the electric motor and the encoder. In some embodiments, the magnetic encoder may be a YC2010-31 brushless electric motor incremental Hall magnetism-sensitive encoder or a QY1503-SPI type mini-encoder.

The controller may be configured to calculate the rotating speed of the main brush based on an amount (e.g., the number) of the high and/or low voltages included in the pulse signals within a predetermined time period. Illustratively, assuming that the encoder magnetic disk includes 8 pairs of N/S poles, and the Hall sensor outputs 8000 pulses in 1 minute, the controller may calculate the rotating speed of the main brush as 8000/8 RPM (or 1000 round per minute).

The opto-electric sensor performs detection based on sensing of lights. However, the working environment of the cleaning robot often has a lot of dust. The dust may accumulate on the cleaning robot over time when the cleaning robot operates in such an environment, which may affect the determination by the opto-electric sensor. Therefore, the Hall sensor may be used. The Hall sensor performs sensing based on magnetism, which is not affected by the dust. Therefore, the Hall sensor can maintain sensing accuracy during operation in a relatively longer time period.

It is understood that the methods for obtaining the rotating speed of the main brush and the components for obtaining the rotating speed are not limited to specific examples in the present disclosure. The above-described methods for obtaining the rotating speed and the components used are merely for illustration. The present disclosure does not limit such methods and components. In fact, a person having ordinary skills in the art can adopt other methods and/or components to obtain the rotating speed of the main brush based on actual needs. For example, the rotating speed of the main brush may be obtained by an externally disposed speed measuring device of the cleaning robot, and the controller may receive the rotating speed of the main brush from the speed measuring device.

Referring back to FIG. 1A, after step S110 is executed to obtain the rotating speed of the main brush, the following steps may be executed.

Step S120, determining whether the rotating speed of the main brush is greater than a predetermined rotating speed.

In the illustrative embodiment, after the rotating speed of the main brush is obtained, it may be needed to determine whether the rotating speed of the main brush is excessively fast, i.e., whether the rotating speed of the main brush is greater than a predetermined rotating speed. If the rotating speed of the main brush is excessively fast, it may indicate that the rotating speed of the main brush is not suitable for the operation of the cleaning robot, and it may be needed to decrease the rotating speed of the main brush such that the rotating speed of the main brush becomes suitable. For example, if the predetermined rotating speed is set as a rotating speed when the cleaning robot operates on a high-friction floor (i.e., a floor having a relatively high friction coefficient), then when the cleaning robot moves on a low-friction floor (i.e., a floor having a relatively low friction coefficient), due to the relatively low friction, the rotating speed of the main brush may be greater than the predetermined rotating speed. It is understood that the friction corresponding to the low-friction floor is smaller than the friction corresponding to the high-friction floor. Illustratively, for example, for carpet and word floor, which are two different floor materials, the friction coefficient of the carpet is higher than the friction coefficient of the wood floor. Thus, the carpet is a high-friction floor, and the wood floor is a low-friction floor.

The predetermined rotating speed is a rotating speed which is used to determine whether the rotating speed of the main brush is excessively fast. Illustratively, the rotating speed of the main brush when the cleaning robot achieves a satisfying cleaning effect on a high-friction carpet floor may be set as the predetermined rotating speed. The predetermined rotating speed may be a predetermined value (e.g., an empirical value obtained through tests), or may be a value obtained through real time calculation based on the working condition, actual needs, and/or predetermined rules. It is understood that the predetermined rotating speed is not limited to be relevant to the friction coefficient of the floor, and can be relevant to other factors, such as the cleanness degree of the floor (regardless of whether the floor is a carpet or a wood floor, the standard rotating speed of the main brush when the cleaning robot operates on a floor that satisfies a certain cleanness degree may be set as the predetermined rotating speed), the maximum power of the electric motor of the main brush, results of multiple tests, and experiences, etc. Therefore, the present disclosure does not limit the influence factors that affect the predetermined rotating speed. It is understood that the present disclosure does not limit the specific value or the methods of setting the predetermined rotating speed. As long as a rotating speed can be used to indicate whether the rotating speed of the main brush is excessively fast, it can be used as the predetermined rotating speed (the "predetermined rotating speed" in step S120 may be referred to as "a first predetermined rotating speed").

In the illustrative embodiment, when the rotating speed of the main brush is greater than the first predetermined rotating speed ("Yes" in the determination of step S120), then it may indicate that the surface-to-be-cleaned is very smooth, which means that the friction/resistance becomes smaller. As a result, the rotating speed of the main brush may be excessively fast. It is also possible that the power of the electric motor of the main brush may be excessively high. At this moment, the rotating speed of the main brush may need to be reduced. Therefore, step S130 may be executed.

Step S130, decreasing the rotating speed of the main brush.

Continuing with the above example, if the rotating speed of the main brush when the cleaning robot is on a carpet, which has a relatively high friction coefficient, is set as the predetermined rotating speed (the first predetermined rotating speed), when the surface-to-be-cleaned becomes a wood floor, which has a relatively low friction coefficient, the rotating speed of the main brush on the wood floor is typically greater than the rotating speed of the main brush on the carpet, which is set as the predetermined rotating speed. Under such circumstances, the rotating speed of the main brush may be excessively fast. Alternatively, if the rotating speed of the main brush when the electric motor of the main brush outputs a standard power is set as the predetermined rotating speed, when the power output from the electric motor of the main brush is fully-loaded or over-loaded, the rotating speed of the main brush is typically excessively fast. In this situation, the rotating speed of the main brush may need to be reduced.

In one implementation, step S130 may also include: when the rotating speed of the main brush is greater than the predetermined rotating speed, controlling an electric motor driver of the main brush to supply a reduced electrical signal to the electric motor of the main brush, to reduce the torque output from the electric motor, thereby decreasing the rotating speed of the main brush to the predetermined rotating speed.

In the illustrative embodiment, if the rotating speed of the main brush needs to be decreased, the controller may control the electric motor driver to supply a reduced voltage/current to the electric motor, to reduce the torque output from the electric motor, thereby decreasing the rotating speed of the main brush to the predetermined rotating speed. It is understood that, if there is no need to adjust the rotating speed of the main brush, the controller may control the electric motor driver of the main brush to supply an unchanged (or constant) voltage/current to the electric motor of the main brush, such that the electric motor outputs an unchanged (or constant) torque, thereby maintaining the rotating speed of the main brush at the predetermined rotating speed.

Therefore, in the illustrative embodiment, the rotating speed of the main brush may be obtained when the main brush cleans the surface-to-be-cleaned. When the rotating speed of the main brush is greater than the predetermined rotating speed (the first predetermined rotating speed), the rotating speed of the main brush may be decreased. Therefore, over-load of the electric motor of the main brush may be avoided, thereby extending the service life of the electric motor of the main brush. In the meantime, power consumption of the cleaning robot may be reduced, thereby increasing the operation time of the cleaning robot.

During the process of cleaning the surface-to-be-cleaned by the main brush, due to certain reasons, the rotating speed of the main brush may be reduced, which may cause the rotating speed of the main brush to be unsatisfactory for the cleaning needs of the cleaning robot. This may result in a degradation of the cleaning effect and/or extension of the cleaning time. The above-described reasons causing the reduction of the rotating speed of the main brush may include, but not be limited to: the surface-to-be-cleaned becoming rougher, the amount of dust on the surface-to-be-cleaned becoming larger, the main brush being tangled with objects such as fabric threads and hair, or the material of the surface-to-be-cleaned having been changed to a material with a greater friction/resistance, etc.

In light of these issues, the present disclosure provides a method for controlling the rotating speed, as shown in FIG. 1B. Referring to FIG. 1B, the illustrative embodiment of the method for controlling the rotating speed may include the following steps:

Step S110, obtaining the rotating speed of the main brush when the main brush cleans the surface-to-be-cleaned. Descriptions of the step S110 may refer to the above detailed descriptions associated with FIG. 1A, which are not repeated.

Step S140, determining whether the rotating speed of the main brush is less than the predetermined rotating speed.

In the illustrative embodiment, after the rotating speed of the main brush is obtained, it may be needed to determine whether the rotating speed of the main brush is excessively slow, i.e., whether the rotating speed of the main brush is less than the predetermined rotating speed. When the rotating speed of the main brush is excessively slow, it may indicate that the rotating speed of the main brush is not suitable for the operation of the cleaning robot, and it may be needed to increase the rotating speed of the main brush such that the rotating speed of the main brush becomes suitable. In one implementation, the rotating speed of the main brush may be compared with the predetermined rotating speed, and whether the rotating speed of the main brush is excessively slow may be determined based on a determination of whether the rotating speed of the main brush is less than the predetermined rotating speed. For example, if the predetermined rotating speed is set as the rotating speed when the cleaning robot is on a low-friction floor (e.g., wood floor), then when the cleaning robot moves to a high-friction floor (e.g., carpet), because the friction increases, the rotating speed of the main brush may become less than the predetermined rotating speed.

The predetermined rotating speed may be a rotating speed for determining whether the rotating speed of the main brush is excessively slow. Illustratively, the rotating speed of the main brush when the cleaning robot achieves a satisfying cleaning effect on a low-friction wood floor may be set as the predetermined rotating speed. The predetermined rotating speed may be a predetermined value (e.g., an empirical value obtained through tests), or may be a value obtained through real time calculation based on the working condition, the actual needs, and/or predetermined rules. It is understood that the predetermined rotating speed is not limited to be relevant to the friction coefficient of the floor, and can be relevant to other influence factors, such as the cleanness degree of the floor (regardless of whether the floor is a carpet or a wood floor, the standard rotating speed of the main brush when the cleaning robot moves on a floor that satisfies a certain cleanness degree may be set as the predetermined rotating speed), the maximum power of the electric motor of the main brush, results from multiple tests, and experiences, etc. The present disclosure does not limit the influence factors that affect the predetermined rotating speed. It is understood that the present disclosure does not limit the specific value of the predetermined rotating speed and the method for setting the predetermined rotating speed. As long as a rotating speed can be used to indicate whether the rotating speed of the main brush is excessively slow, the rotating speed may be set as the predetermined rotating speed (the "predetermined rotating speed" in step S140 may be referred to as "the second predetermined rotating speed").

In the illustrative embodiment, when the rotating speed of the main brush is less than the second predetermined rotating speed ("Yes" in the determination of step S140), it may indicate that the friction/resistance of the surface-to-be-cleaned is increased, or that the amount of dust on the surface-to-be-cleaned is excessively large, or that the main brush is tangled with objects such as fabric threads and hair. These factors may all cause the rotating speed of the main brush to be excessively slow. At this moment, there may be a need to increase the rotating speed of the main brush. Therefore, the following step S150 may be executed.

Step S150, increasing the rotating speed of the main brush.

Continuing with the above-described example, if the rotating speed of the main brush when the cleaning robot operates on a wood floor is set as the predetermined rotating speed (the second predetermined rotating speed), then, when the surface-to-be-cleaned is a carpet that has a relatively high friction coefficient, the rotating speed of the main brush when the cleaning robot is on the carpet typically is less than the rotating speed on the wood floor that has a relatively low friction coefficient, which is set at the predetermined rotating speed. Under such circumstances, the rotating speed of the main brush may be excessively slow. The reduction of the rotating speed to become excessively slow may alternatively or additionally be caused by factors such as the amount of dust on the surface-to-be-cleaned becoming excessively large, or the main brush being tangled with objects such as fabric threads and hair. At this moment, there may be a need to increase the rotating speed of the main brush.

In one implementation, step S150 may include: when the rotating speed of the main brush is less than the predetermined rotating speed, controlling the electric motor driver to supply an increased electrical signal to the electric motor, to increase the torque output from the electric motor, thereby increasing the rotating speed of the main brush to the predetermined rotating speed.

In the illustrative embodiment, in order to increase the rotating speed of the main brush, the controller may control the electric motor driver to increase the supply of the voltage/current to the electric motor, to increase the torque output from the electric motor, thereby increasing the rotating speed of the main brush to the predetermined rotating speed.

As such, in the illustrative embodiment, the rotating speed of the main brush may be obtained when the main brush cleans the surface-to-be-cleaned. When the rotating speed of the main brush is less than the predetermined rotating speed (the second predetermined rotating speed), the rotating speed of the main brush may be increased. As such, the same cleaning effect and/or cleaning time may be maintained by maintaining the rotating speed of the main brush at the predetermined rotating speed. As a result, the degradation of the cleaning effect and/or the extension of the cleaning time caused by the excessively slow rotating speed of the main brush may be avoided.

It should be noted that in the process of controlling the rotating speed of the main brush, the controller may only determine whether the rotating speed of the main brush is greater than the predetermined rotating speed (which may be, for example, set as the rotating speed of the main brush when the cleaning robot is on a carpet, also referred to as "the first predetermined rotating speed"), and may reduce the rotating speed of the main brush when the rotating speed of the main brush is greater than the first predetermined rotating speed (for example, when the cleaning robot moves on a wood floor, the resistance experienced by the main brush may be smaller than the resistance experienced by the main brush when the cleaning robot is on the carpet, at this moment, the rotating speed of the main brush may be greater than the first predetermined rotating speed), and may not need to determine whether the rotating speed of the main brush is less than another predetermined rotating speed (which may be, for example, the rotating speed of the main brush when the cleaning robot is on the wood floor, also referred to as "the second predetermined rotating speed"); alternatively, the controller may only determine whether the rotating speed of the main brush is less than the second predetermined rotating speed, and may increase the rotating speed of the main brush when the rotating speed of the main brush is less than the second predetermined rotating speed (for example, when the cleaning robot moves on the carpet, the resistance experienced by the main brush is greater than the resistance experienced by the main brush when the cleaning robot is on the wood floor, at this moment, the rotating speed of the main brush may be less than the second predetermined rotating speed), and may not need to determine whether the rotating speed of the main brush is greater than the first predetermined rotating speed.

In an implementation, the predetermined rotating speed may be a predetermined rotating speed range. The rotating speed of the main brush may be controlled according to the method shown in FIGS. 2A-2B.

Figure 2A:
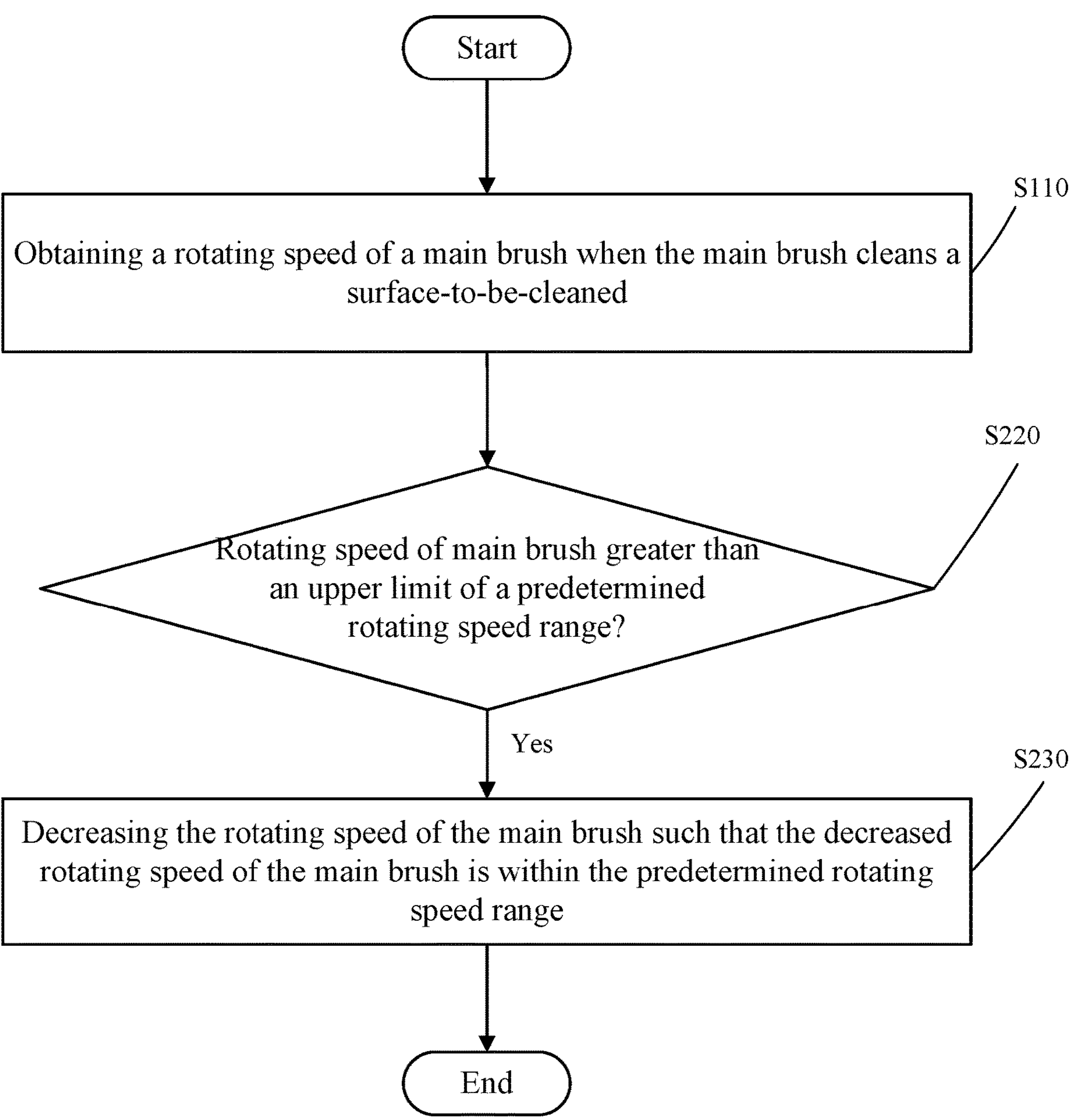
FIGS. 2A and 2B illustrate example flowcharts showing methods for controlling the rotating speed of the main brush of a cleaning robot, according to illustrative embodiments of the present disclosure.
Figure 2B:
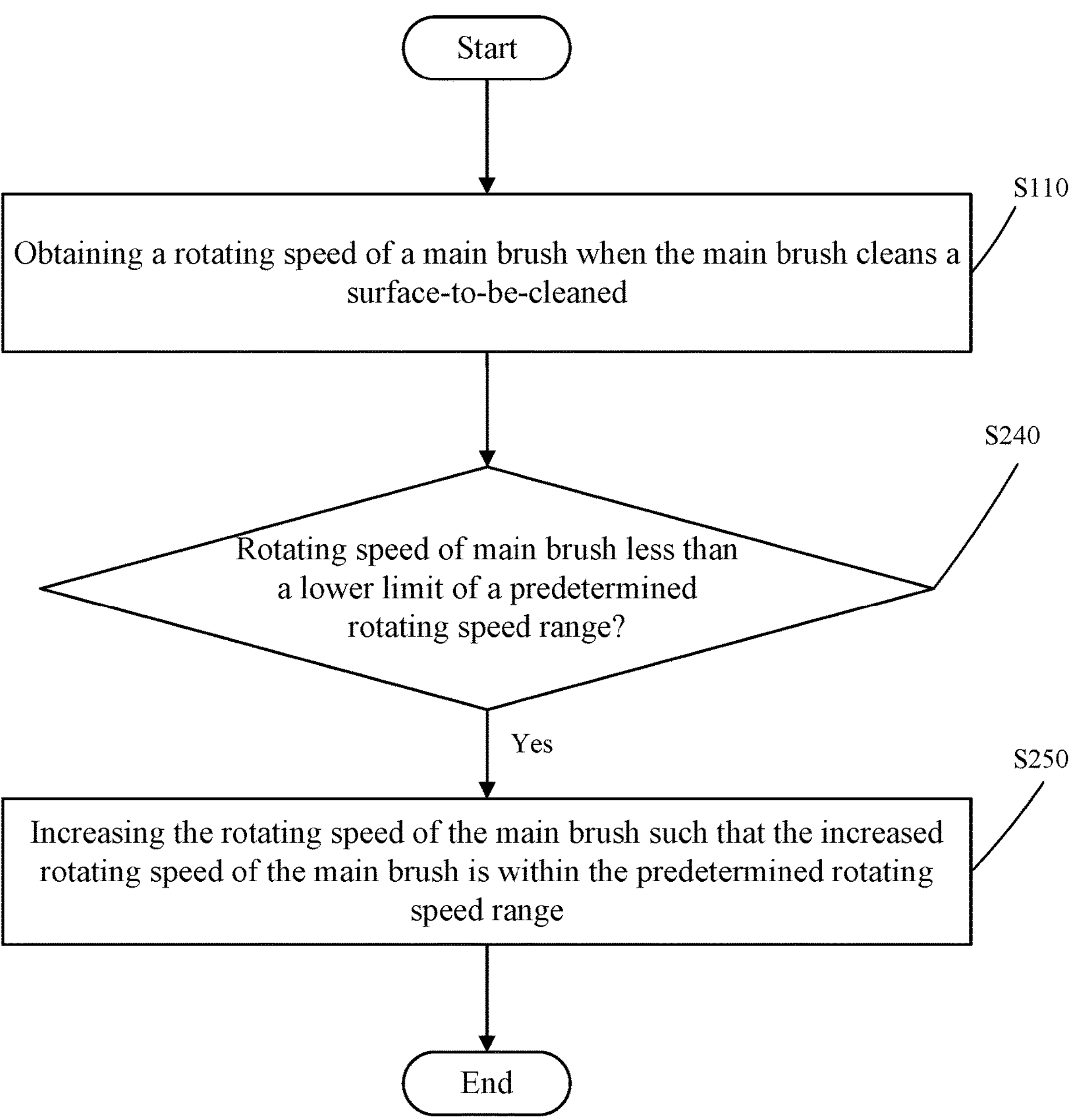

Referring to FIGS. 2A-2B, the predetermined rotating speed may be a predetermined rotating speed range. The predetermined rotating speed range may be a pre-set range formed by a predetermined upper limit and a predetermined lower limit (for example, an empirical range obtained through experiments), or may be a range formed by an upper limit and a lower limit obtained through real time calculation based on the working condition, actual needs, and/or predetermined rules. Illustratively, the predetermined rotating speed range may be [900 RPM, 1100 RPM], in which 900 RPM (round per minute) is the lower limit of the predetermined rotating speed range, and 1100 RPM is the upper limit of the predetermined rotating speed range. It should be noted that the predetermined rotating speed range is not limited to be relevant to the friction coefficient of the floor, and may be relevant to other factors, such as the cleanness degree of the floor (regardless of whether the floor a carpet or a wood floor, the standard rotating speed range of the main brush when the cleaning robot moves on a floor having a satisfying cleanness degree can be set as the predetermined rotating speed range), the maximum power of the electric motor of the main brush, results of multiple tests, and experience, etc. Therefore, the present disclosure does not limit the influence factors of the predetermined rotating speed range. The predetermined rotating speed range may be other suitable range. Due to the limitation of space, the present disclosure does not further provide other examples of the rotating speed range.

When the rotating speed of the main brush is not less than the lower limit and the rotating speed of the main brush is not greater than the upper limit, the rotating speed of the main brush is within the predetermined rotating speed range. The rotating speed of the main brush is suitable, and there may be no need to adjust the rotating speed of the main brush. Conversely, when the rotating speed of the main brush is less than the lower limit (e.g., when the determination is "Yes" in step S240 of FIG. 2B), or when the rotating speed of the main brush is greater than the upper limit (e.g., when the determination is "Yes" in step S220 of FIG. 2A), the rotating speed of the main brush is not within the predetermined rotating speed range. The rotating speed of the main brush is not suitable, and there may be a need to adjust the rotating speed of the main brush to be within the predetermined rotating speed range.

Referring to FIG. 2A, the method for controlling the rotating speed of the main brush according to an illustrative embodiment may include the following steps:

Step S110, obtaining the rotating speed of the main brush when the main brush cleans the surface-to-be-cleaned. Descriptions of the step S110 may refer to the detailed descriptions rendered in connection with FIG. 1A, which are not repeated.

Step S220, determining whether the rotating speed of the main brush is greater than the upper limit of the predetermined rotating speed range. Illustratively, the rotating speed range corresponding to the rotating speed of the main brush when the cleaning robot is on a carpet with a satisfying cleaning effect may be set as the predetermined rotating speed range. The upper limit of that specific rotating speed range is set as the upper limit of the predetermined rotating speed range (the "predetermined rotating speed range" in step S220 may be referred to as "the first predetermined rotating speed range"). When a determination is made that "the rotating speed of the main brush is greater than the upper limit of the predetermined rotating speed range," step S230 may be executed.

Step S230, decreasing the rotating speed of the main brush such that the decreased rotating speed of the main brush is within the predetermined rotating speed range (the first predetermined rotating speed range).

In the illustrative embodiment, the rotating speed of the main brush may be obtained. A determination may be made as to whether the rotating speed of the main brush is excessively fast by determining whether the rotating speed of the main brush is greater than the upper limit of the predetermined rotating speed range (first predetermined rotating speed range). When the rotating speed of the main brush is greater than the upper limit of the predetermined rotating speed range, it may be caused by an excessively large power of the electric motor of the main brush, or may be caused by a very smooth surface-to-be-cleaned, which has a reduced friction/resistance. These factors can all cause the rotating speed of the main brush to be excessively fast. At this moment, the rotating speed of the main brush may need to be reduced, such that the reduced rotating speed of the main brush is within the predetermined rotating speed range. As such, the over-load of the electric motor of the main brush can be avoided, which can extend the service life of the electric motor of the main brush. In the meantime, power consumption of the cleaning robot may be reduced, thereby increasing the operation time of the cleaning robot.

Referring to FIG. 2B, the method for controlling the rotating speed of the main brush according to an illustrative embodiment may include the following steps:

Step S110, obtaining the rotating speed of the main brush when the main brush cleans the surface-to-be-cleaned. Descriptions of step S110 may refer to the previous descriptions rendered in connection with FIG. 1A, which are not repeated.

Step S240, determining whether the rotating speed of the main brush is less than the lower limit of the predetermined rotating speed range. Illustratively, the rotating speed range corresponding to the rotating speed of the main brush when the cleaning robot achieves a satisfying cleaning effect on a wood floor may be set as the predetermined rotating speed range. The lower limit of that specific rotating speed range is set as the lower limit of the predetermined rotating speed range (the "predetermined rotating speed range" in step S240 may be referred to as the "second predetermined rotating speed range"). When a determination is made that "the rotating speed of the main brush is less than the lower limit of the predetermined rotating speed range," step S250 may be executed.

Step S250, increasing the rotating speed of the main brush such that the increased rotating speed of the main brush is within the predetermined rotating speed range (the second predetermined rotating speed range).

In the illustrative embodiment, the rotating speed of the main brush may be obtained. A determination may be made as to whether the rotating speed of the main brush is excessively slow by determining whether the rotating speed of the main brush is less than the lower limit of the predetermined rotating speed range (second predetermined rotating speed range). When the rotating speed of the main brush is less than the lower limit of the predetermined rotating speed range, it may indicate that the friction/resistance of the surface-to-be-cleaned is increased, or that the amount of dust on the surface-to-be-cleaned is excessively large, or that the main brush is tangled with objects such as fabric threads and hair. These factors may all cause the rotating speed of the main brush to become excessively slow. At this moment, there may be a need to increase the rotating speed of the main brush, such that the increased rotating speed of the main brush falls within the predetermined rotating speed range. As such, the same cleaning effect and/or cleaning time may be maintained by maintaining the rotating speed of the main brush to be within the predetermined rotating speed range.

It should be noted that during the process of controlling the rotating speed of the main brush, the controller may only determine whether the rotating speed of the main brush is greater than the upper limit of the predetermined rotating speed range (e.g., the rotating speed range corresponding to the rotating speed of the main brush when the cleaning robot is on a carpet, also referred to as "the first predetermined rotating speed range"), and decrease the rotating speed of the main brush when the rotating speed of the main brush is greater than the upper limit of the first predetermined rotating speed range (for example, when the cleaning robot moves on a wood floor, the resistance experienced by the main brush is smaller than the resistance experienced by the main brush when the cleaning robot moves on the carpet, at this moment, the rotating speed of the main brush may be greater than the upper limit of the first predetermined rotating speed range), and may not need to determine whether the rotating speed of the main brush is less than a second predetermined rotating speed range (e.g., the rotating speed range corresponding to the rotating speed of the main brush when the cleaning robot is on the wood floor, also referred to as "the second predetermined rotating speed range"). Alternatively, the controller may only determine whether the rotating speed of the main brush is less than the lower limit of the second predetermined rotating speed range, and increase the rotating speed of the main brush when the rotating speed of the main brush when the rotating speed of the main brush is less than the lower limit of the second predetermined rotating speed range (for example, when the cleaning robot moves on the carpet, the resistance experienced by the main brush is greater than the resistance experienced by the main brush when the cleaning robot moves on wood floor, at this moment, the rotating speed of the main brush may be less than the lower limit of the second predetermined rotating speed range), and may not need to determine whether the rotating speed of the main brush is greater than the upper limit of the first predetermined rotating range.

In an implementation, the predetermined rotating speed may be a predetermined rotating speed value. At this moment, the rotating speed of the main brush may be controlled using the method shown in FIGS. 3A-3B.

Figure 3A:
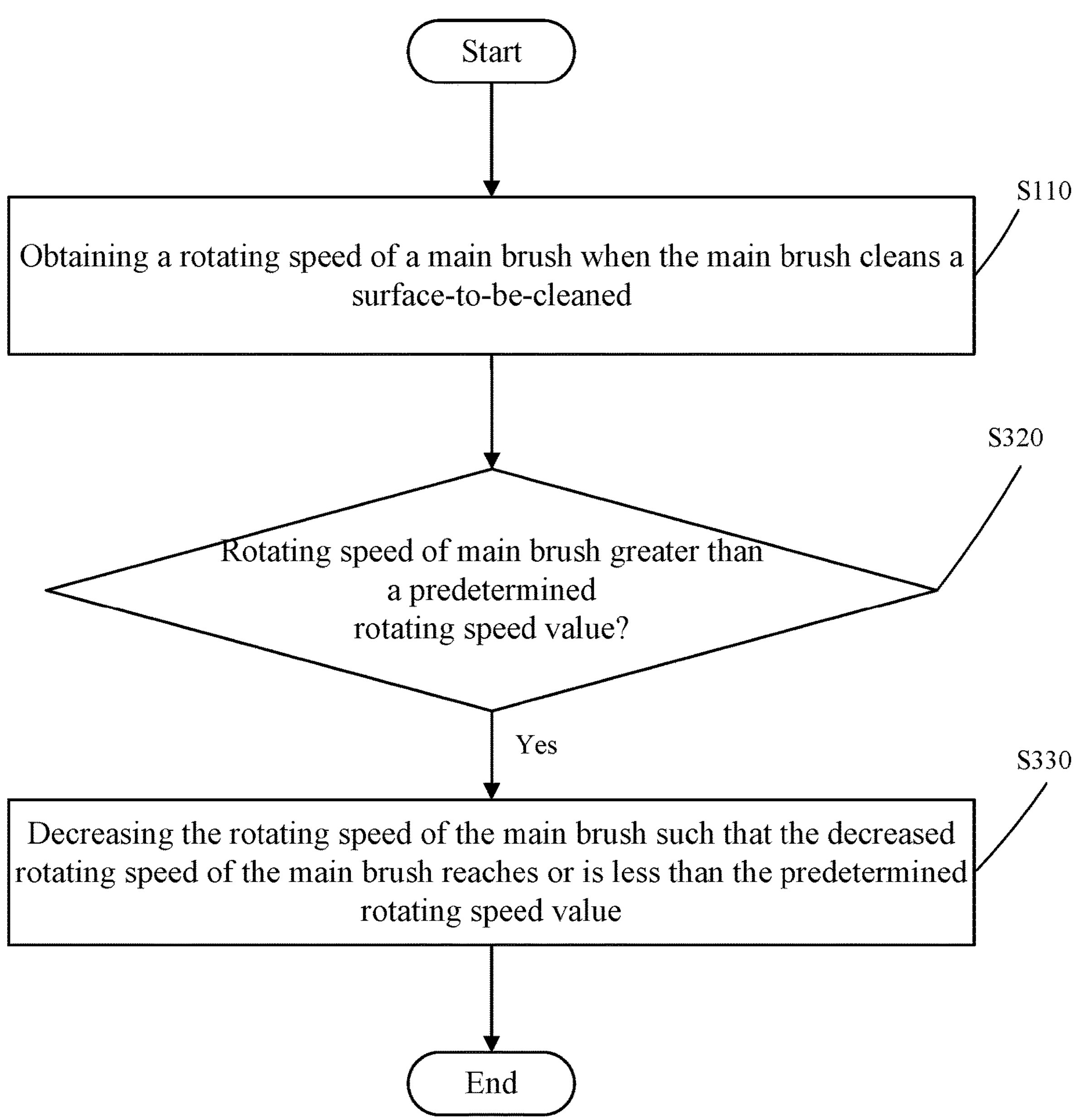
FIGS. 3A and 3B illustrate example flowcharts showing methods for controlling the rotating speed of the main brush of a cleaning robot, according to illustrative embodiments of the present disclosure.
Figure 3B:
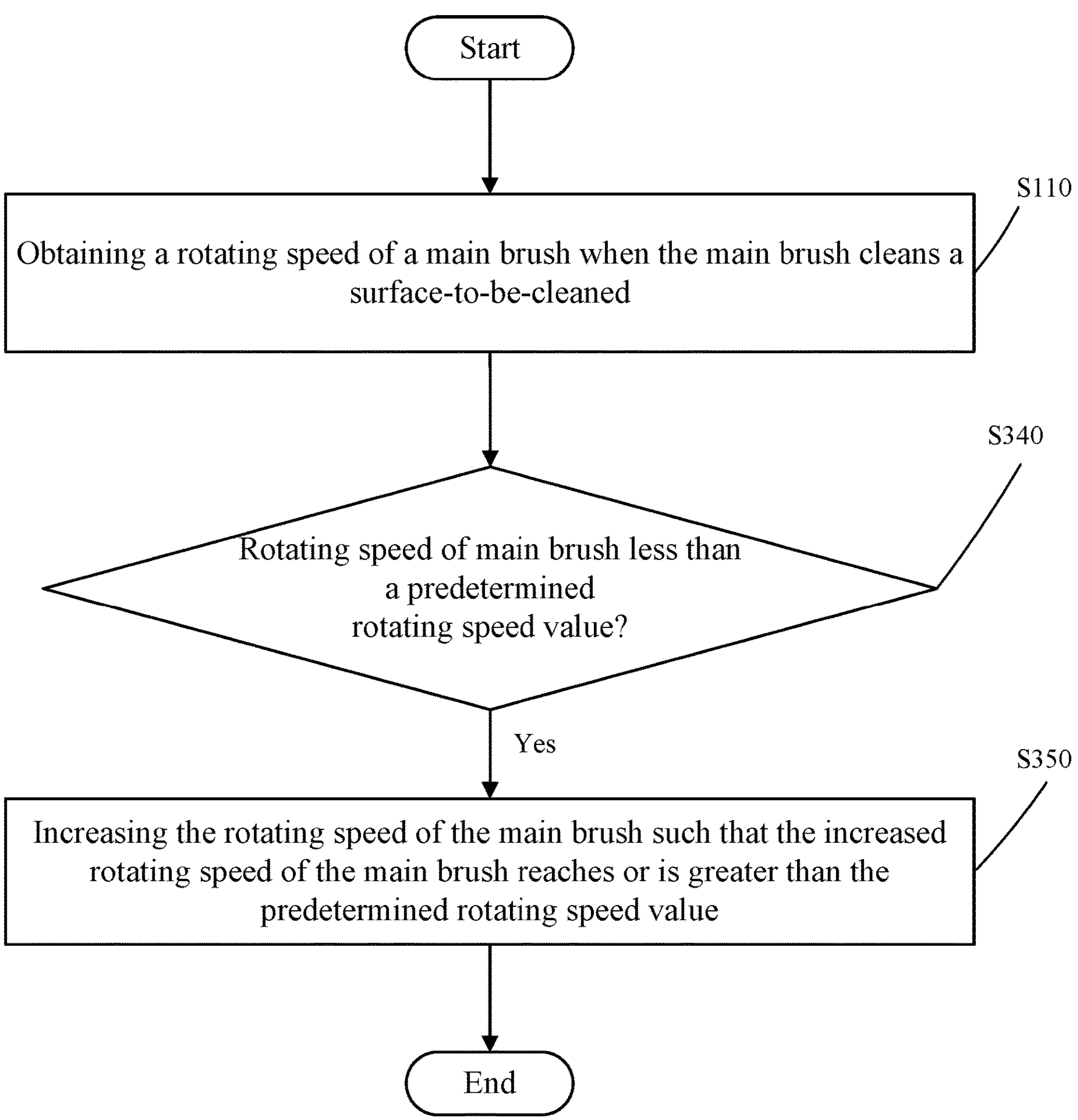

Referring to FIGS. 3A-3B, instead of being a predetermined rotating speed range, the predetermined rotating speed may also be a predetermined rotating speed value (such as an empirical value obtained through experiments), or may be a value obtained through real time calculation based on the working condition, the actual needs, and/or the predetermined rules. Illustratively, the predetermined rotating speed value is set as 1000 RPM. Any other suitable value may be used as the predetermined rotating speed value. Due to the limitation on the space, the present disclosure does not discuss other examples.

When the rotating speed of the main brush equals the predetermined rotating speed value, the rotating speed is suitable, and there is no need to adjust the rotating speed of the main brush. Conversely, when the rotating speed of the main brush is greater than the predetermined rotating speed value or the rotating speed of the main brush is less than the predetermined rotating speed value, the rotating speed of the main brush is not suitable, and may need to be adjusted such that the adjusted rotating speed of the main brush closely approaches or equals the predetermined rotating speed value.

Referring to FIG. 3A, the method for controlling the rotating speed of the main brush according to an illustrative embodiment may include the following steps:

Step S110, obtaining the rotating speed of the main brush when the main brush cleans the surface-to-be-cleaned. Descriptions of the step S110 may refer to the above descriptions rendered in connection with FIG. 1A, which are not repeated.

Step S320, determining whether the rotating speed of the main brush is greater than the predetermined rotating speed value. Illustratively, the rotating speed of the main brush when the cleaning robot is on a carpet may be set as the predetermined rotating speed value (the "predetermined rotating speed value" in step S320 may be referred to as the "first predetermined rotating speed value"). Under a determination that "the rotating speed of the main brush is greater than the predetermined rotating speed value" (i.e., "Yes" in the determination of step S320), step S330 may be executed.

Step S330, decreasing the rotating speed of the main brush such that the decreased rotating speed of the main brush reaches or is less than the predetermined rotating speed value (the first predetermined rotating speed value).

In the illustrative embodiment, the rotating speed of the main brush is obtained, and a determination may be made as to whether the rotating speed of the main brush is excessively fast by determining whether the rotating speed of the main brush is greater than the predetermined rotating speed value (the first predetermined rotating speed value). When the rotating speed of the main brush is greater than the predetermined rotating speed value, it may indicate that the surface-to-be-cleaned is very smooth, which reduces the friction/resistance, or that the power of the electric motor of the main brush is excessively large. These factors can all cause the rotating speed of the main brush to be excessively fast. At this moment, there may be a need to reduce the rotating speed of the main brush, such that the reduced rotating speed of the main brush reaches or is less than the predetermined rotating speed value. As such, the power consumption by the cleaning robot may be reduced, thereby increasing the operation time of the cleaning robot. In the meantime, over-load of the electric motor of the main brush may be avoided, thereby extending the service life of the electric motor of the main brush. It should be understood that the reduction of the rotating speed of the main brush may not necessarily be relevant to the change in the friction of the floor.

Referring to FIG. 3B, the method for controlling the rotating speed of the main brush according to an illustrative embodiment may include the following steps:

Step S110, obtaining the rotating speed of the main brush when the main brush cleans the surface-to-be-cleaned. The descriptions of the step S110 can refer to the above descriptions rendered in connection with FIG. 1A, which are not repeated.

Step S340, determining whether the rotating speed of the main brush is less than the predetermined rotating speed value. Illustratively, the rotating speed of the main brush when the cleaning robot is on a wood floor may be set as the predetermined rotating speed value (the "predetermined rotating speed value" in step S340 may be referred to as the "second predetermined rotating speed value"). When it is determined that "the rotating speed of the main brush is less than the predetermined rotating speed value" (i.e., "Yes" in the determination of step S340), step S350 may be executed.

Step S350, increasing the rotating speed of the main brush such that the increased rotating speed of the main brush reaches or is greater than the predetermined rotating speed value (the second predetermined rotating speed value).

In the illustrative embodiment, the rotating speed of the main brush is obtained, and a determination may be made as to whether the rotating speed of the main brush is excessively slow by determining whether the rotating speed of the main brush is less than the predetermined rotating speed value (the second predetermined rotating speed value). When the rotating speed of the main brush is less than the predetermined rotating speed value, it may indicate that the friction/resistance of the surface-to-be-cleaned is increased, or that the amount of the dust on the surface-to-be-cleaned is excessively large, or that the main brush is tangled with objects such as fabric threads and hair. These factors can all cause the rotating speed of the main brush to be excessively slow. At this moment, there may be a need to increase the rotating speed of the main brush, such that the increased rotating speed of the main brush reaches or is greater than the predetermined rotating speed value. As such, the same cleaning effect and/or cleaning time may be maintained by maintaining the rotating speed of the main brush to be equal to or greater than the predetermined rotating speed value. It should be noted that the increase in the rotating speed of the main brush may not necessarily be relevant to the change in the friction of the floor.

It should be noted that during the process of controlling the rotating speed of the main brush, the controller may only determine whether the rotating speed of the main brush is greater than the predetermined rotating speed value (e.g., the rotating speed of the main brush when the cleaning robot is on a carpet, also referred to as "the first predetermined rotating speed value"), and when the rotating speed of the main brush is greater than the first predetermined rotating speed value, decrease the rotating speed of the main brush (for example, when the cleaning robot moves on a wood floor, the resistance experienced by the main brush is smaller than the resistance experienced by the main brush when the cleaning robot is on the carpet, at this moment, the rotating speed of the main brush may be greater than the first predetermined rotating speed value), and may not need to determine whether the rotating speed of the main brush is less than another predetermined rotating speed value (such as the rotating speed of the main brush when the cleaning robot is on a wood floor, also referred to as "the second predetermined rotating speed value"); alternatively, the controller may only determine whether the rotating speed of the main brush is less than the second predetermined rotating speed value, and when the rotating speed of the main brush is less than the second predetermined rotating speed value, increase the rotating speed of the main brush (for example, when the cleaning robot moves on the carpet, the resistance experienced by the main brush is greater than the resistance experienced by the main brush when the cleaning robot moves on the wood floor, at this moment, the rotating speed of the main brush may be less than the second predetermined rotating speed value), and may not need to determine whether the rotating speed of the main brush is greater than the first predetermined rotating speed value.

In the illustrative embodiment, a phenomenon is taken into account where the voltage/current signal at the electric motor exceeds a predetermined voltage signal threshold/current signal threshold (i.e., the over-current of the electric motor), which may cause the electric motor to malfunction. Furthermore, if no measure is taken, the electric motor and other related components may be damaged.

Therefore, the controller may be configured to monitor whether a relevant electrical signal at the electric motor (e.g., voltage/current signal) exceeds a predetermined electric signal threshold (e.g., the predetermined voltage signal threshold/current signal threshold); and when the relevant electrical signal exceeds the predetermined electrical signal threshold, output an alarm signal indicating over-current and/or stop the rotation of the electric motor within a predetermined time period. At this moment, the method shown in FIGS. 4A-4B may be executed.

Figure 4A:
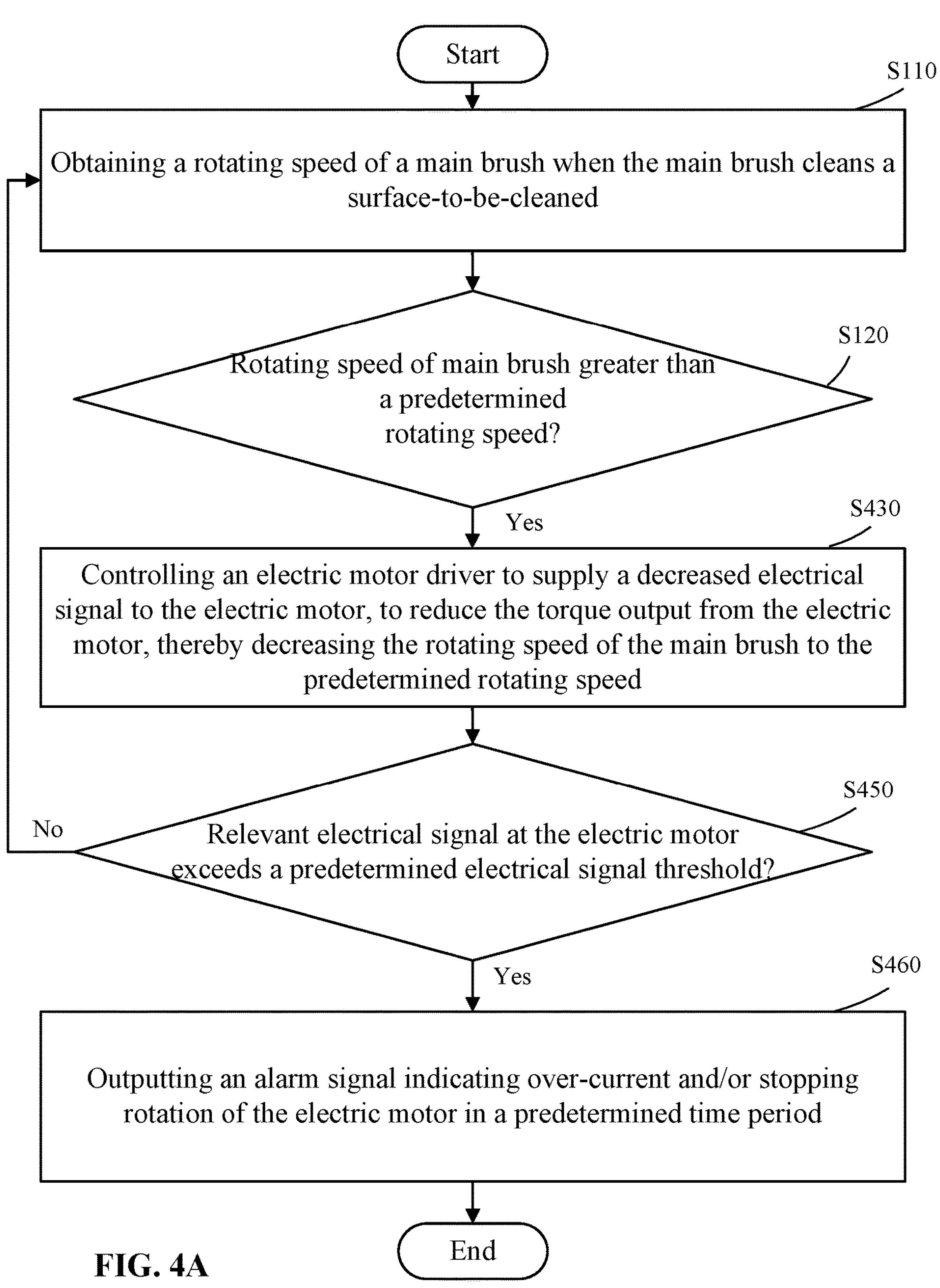
FIGS. 4A and 4B illustrate example flowcharts showing methods for controlling the rotating speed of the main brush of a cleaning robot, according to illustrative embodiments of the present disclosure.

Referring to FIG. 4A, in addition to executing the steps S110 and S120 shown in FIG. 1A, the method may also include executing step S430 when a determination is made that "the rotating speed of the main brush is greater than the predetermined rotating speed" in step S120.

Step S430, controlling the electric motor driver to supply a reduced electrical signal to the electric motor, to reduce the torque output from the electric motor, thereby decreasing the rotating speed of the main brush to the predetermined rotating speed. Then, step S450 may be executed.

Step S450, monitoring whether a relevant electrical signal at the electric motor exceeds a predetermined electrical signal threshold. When it is detected that "the relevant electrical signal at the electric motor exceeds the predetermined electrical signal threshold," step S460 may be executed; conversely, when it is detected that "the relevant electrical signal at the electric motor does not exceed the predetermined electrical signal threshold," step S110 may be repeated.

Step S460, outputting an alarm signal indicating over-current and/or stopping the rotation of the electric motor within a predetermined time period.

Figure 4B:
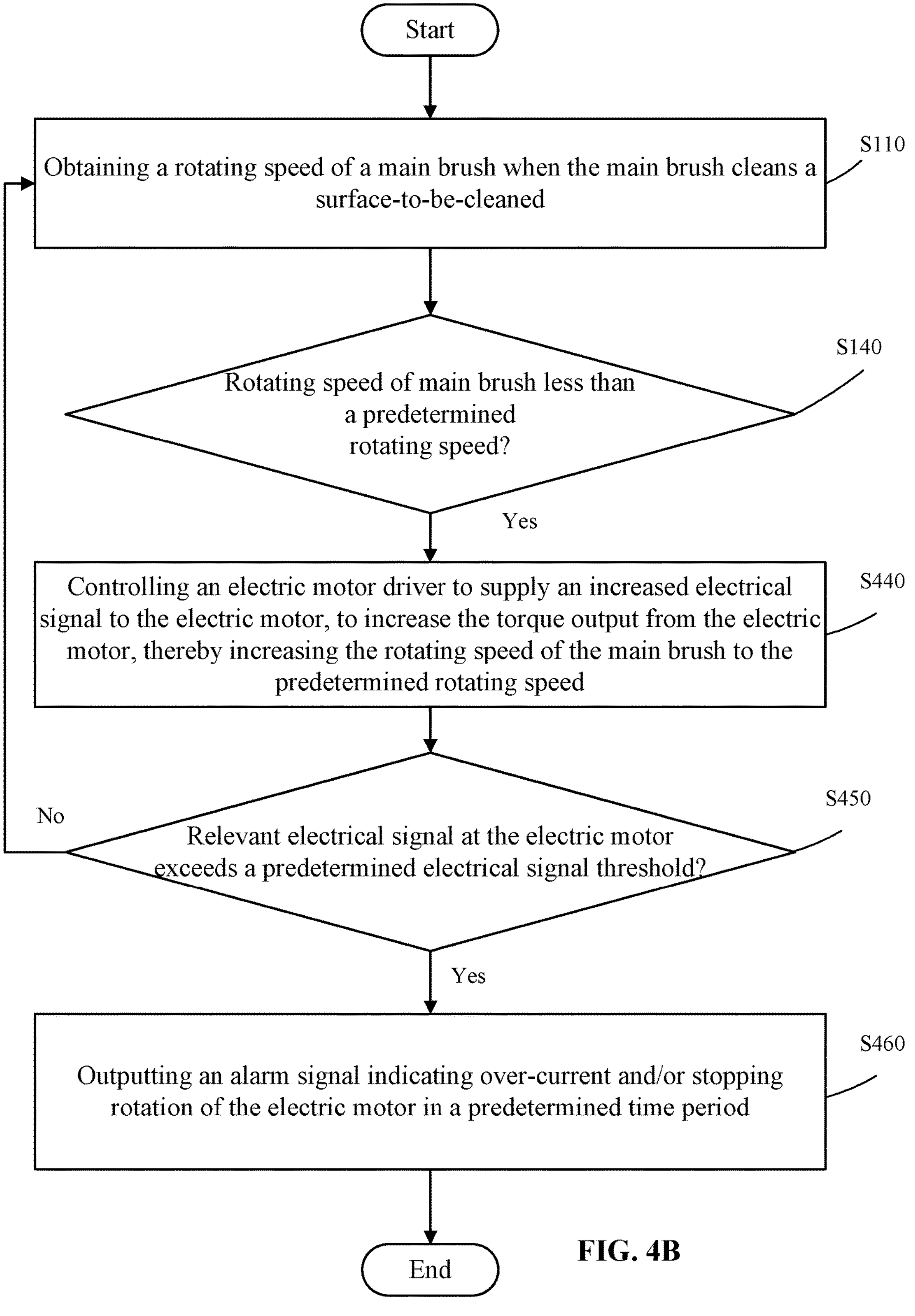

Referring to FIG. 4B, in addition to executing steps S110 and S140 shown in FIG. 1B, the method may also include executing step S440 when it is determined that "the rotating speed of the main brush is less than the predetermined rotating speed" in step S140. Step S440, controlling the electric motor driver to supply an increased electrical signal to the electric motor, to increase the torque output from the electric motor, thereby increasing the rotating speed of the main brush to the predetermined rotating speed. Then, steps S450 and S460 may be executed, similar to FIG. 4A.

In the illustrative embodiment, the controller may also monitor whether the voltage signal/current signal at the electric motor exceeds the predetermined voltage signal threshold/current signal threshold, thereby detecting whether there is an over-current. When it is detected that the voltage signal/current signal at the electric motor exceeds the predetermined voltage signal threshold/current signal threshold, then over-current at the electric motor is detected. Correspondingly, the controller may output an alarm signal indicating the over-current to alert the user and/or stop the rotation of the electric motor within the predetermined time period, to protect the electric motor. Conversely, when it is detected that the voltage signal/current signal at the electric motor does not exceed the predetermined voltage signal threshold/current signal threshold, then over-current at the electric motor is not detected, and other steps of the above-described method for controlling the rotating speed of the main brush may continue to be executed.

As such, over-current at the electric motor may be detected by determining whether the voltage signal/current signal at the electric motor exceeds the predetermined voltage signal threshold/current signal threshold. Furthermore, an alarm signal indicating the over-current may be output and/or the rotation of the electric motor may be stopped within a predetermined time period, thereby addressing the over-current at the electric motor.

In the illustrative embodiment, a phenomenon is taken into account where the it is possible that at a certain moment noise may cause the voltage signal/current signal at the electric motor to exceed the predetermined voltage signal threshold/current signal threshold, and at a next moment or even within a next time period both of the voltage signal and the current signal at the electric motor do not exceed the corresponding voltage signal threshold and the current signal threshold. At this moment, it is possible that the noise may cause a false detection of an over-current at the electric motor.

As such, the controller may monitor whether the relevant electrical signal at the electric motor exceeds the predetermined electrical signal threshold within the first predetermined time period; when the relevant electrical signal exceeds the predetermined electrical signal threshold within the first predetermined time period, the controller may output an alarm signal indicating over-current and/or stop the rotation of the electric motor within a predetermined time period. At this moment, the method shown in FIGS. 5A-5B may be executed.

Figure 5A:
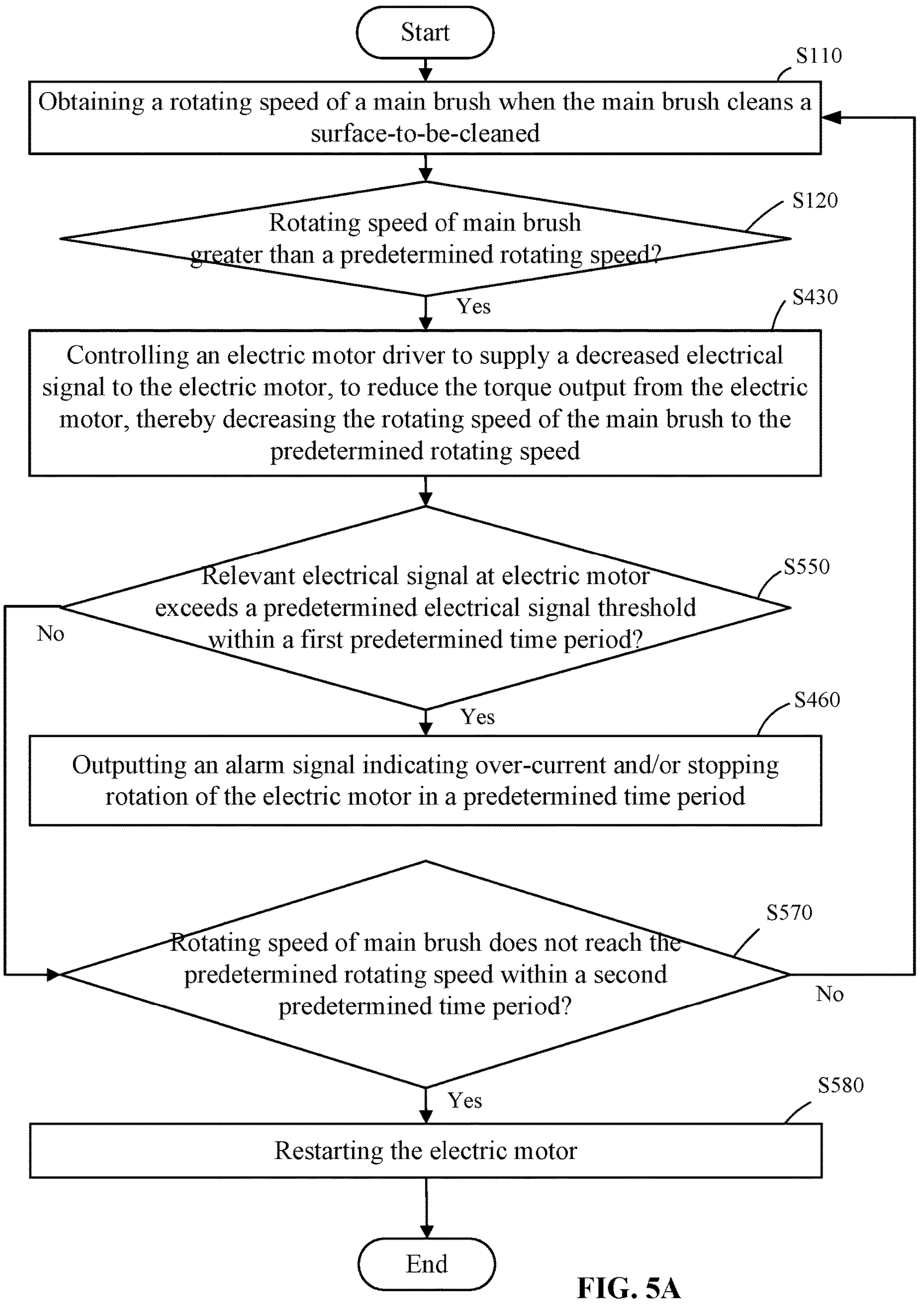
FIGS. 5A and 5B illustrate example flowcharts showing methods for controlling the rotating speed of the main brush of a cleaning robot, according to illustrative embodiments of the present disclosure.

Referring to FIG. 5A, in addition to executing the steps S110, S120, and S430, the method may also include executing step S550 after step S430.

Step S550, monitoring whether the relevant electrical signal at the electric motor exceeds the predetermined electrical signal threshold within a first predetermined time period. When it is detected that "the relevant electrical signal at the electric motor exceeds the predetermined electrical signal threshold within the first predetermined time period," step S460 may be executed; conversely, when it is detected that "the relevant electrical signal at the electric motor does not exceed the predetermined electrical signal threshold within the first predetermined time period," step S570 may be executed.

Step S570, monitoring whether the rotating speed of the main brush reaches a predetermined rotating speed within a second predetermined time period. When it is detected that "the rotating speed of the main brush reaches the predetermined rotating speed within the second predetermined time period," steps S580 may be executed; Step 580: restarting the electric motor; Conversely, when it is detected that "the rotating speed of the main brush does not reach the predetermined rotating speed within the second predetermined time period," step S110 may be repeated.

Figure 5B:
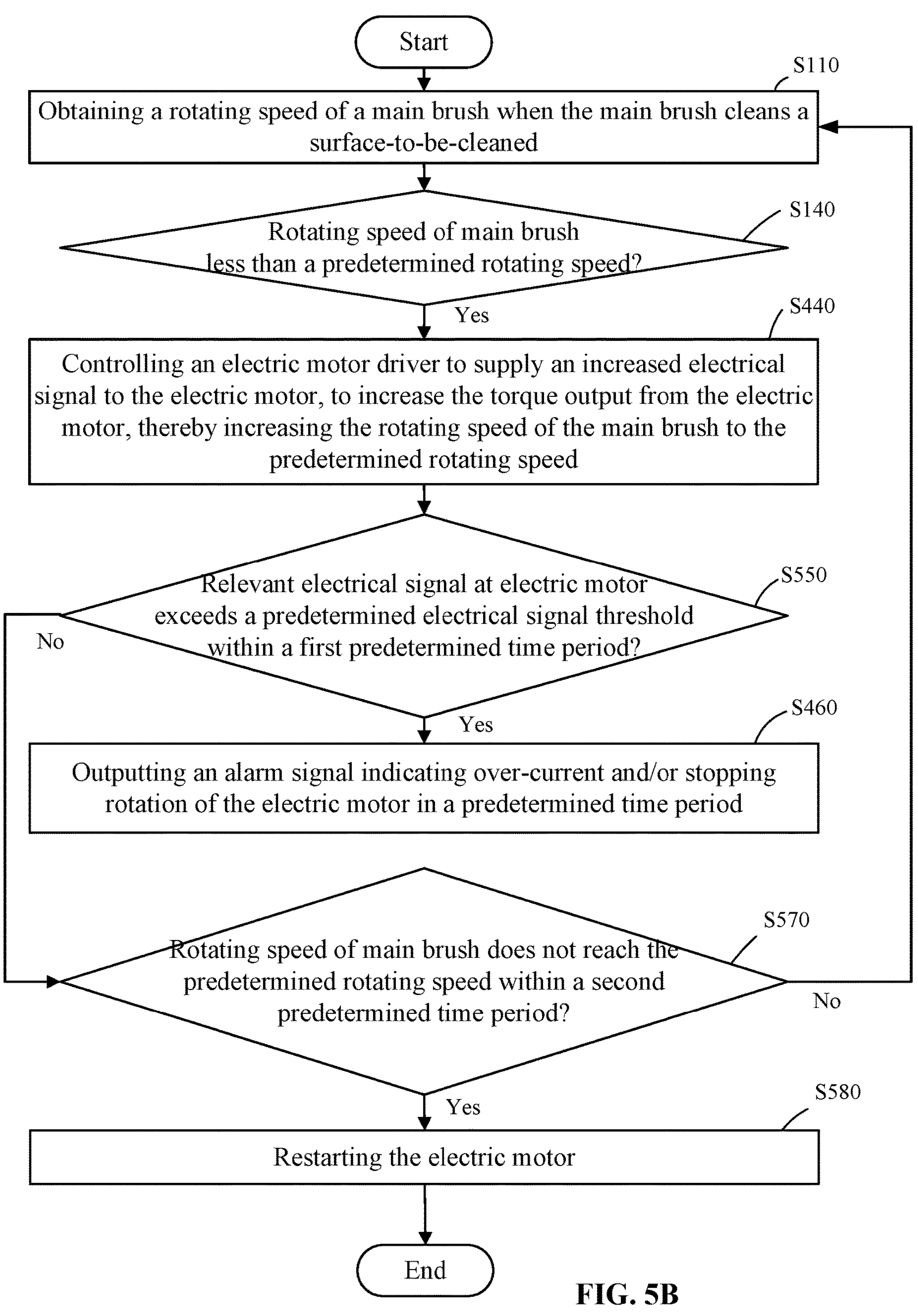

Referring to FIG. 5B, in addition to executing steps S110, S140, and S440, the method may also include executing steps S550, S460, S570, and S580 after step S440, similar to FIG. 5A.

In the illustrative embodiment, the controller may monitor whether the voltage signal/current signal at the electric motor exceeds a predetermined voltage signal threshold/current signal threshold within the first predetermined time period, thereby detecting whether there is an over-current at the electric motor. When it is detected that the voltage signal/current signal at the electric motor exceeds the predetermined voltage signal threshold/current signal threshold within the first predetermined time period, an over-current at the electric motor is detected; conversely, when it is detected that the voltage signal/current signal at the electric motor does not exceed the predetermined voltage signal threshold/current signal threshold within the first predetermined time period, an over-current at the electric motor is not detected.

As such, in comparison with the method of roughly detecting whether an over-current occurs at the electric motor by detecting whether the voltage signal/current signal at the electric motor exceeds the predetermined voltage signal threshold/current signal threshold, in this embodiment, the method more precisely detect whether an over-current occurs at the electric motor by detecting whether the voltage signal/current signal at the electric motor exceeds the predetermined voltage signal threshold/current signal threshold within the first predetermined time period, thereby increasing the accuracy of the detection of the over-current of the electric motor.

Correspondingly, to address the over-current of the electric motor, at least one of the methods of outputting an alarm signal indicating the over-current or stopping the rotation of the electric motor within the predetermined time period may be adopted.

In addition, under certain circumstances, for example, when the main brush is tangled with objects such as hair, fabric threads, and cannot rotate normally, i.e., when the phenomenon of rotation jamming of the main brush occurs, at this moment, even if the torque output from the electric motor is increased, the rotating speed of the main brush may still not be increased to reach the predetermined rotating speed. To address this issue, in some embodiments, a plurality of methods may be used to mitigate the phenomenon of rotation jamming of the main brush, for example, removing the objects tangling the main brush, and restarting the electric motor. When the rotation jamming of the main brush is eliminated, the main brush can work normally. Under such circumstances, when the torque output from the electric motor is increased, the rotating speed of the main brush can be increased accordingly to reach the predetermined rotating speed.

Therefore, when over-current of the electric motor does not occur (i.e., when the electric motor works normally), the rotation jamming of the main brush may be detected through determining whether the rotating speed of the main brush reaches the predetermined rotating speed within the second predetermined time period. When the rotating speed of the main brush does not reach the predetermined rotating speed within the second predetermined time period ("Yes" in the determination of step S570), then it may indicate that the rotation jamming of the main brush has occurred, and corresponding measures may need to be taken to restore the main brush from the rotation jamming state to the normal working state, and then to restart the electric motor (step S580) such that the rotating speed of the main brush can be increased to reach the predetermined rotating speed. Conversely, when the rotating speed of the main brush does not reach the predetermined rotating speed within the second predetermined time period ("No" in the determination of step S570), it may indicate that the rotation jamming of the main brush has not occurred, and therefore, there is no need to restart the electric motor.

As such, when over-current of the electric motor does not occur ("No" in the determination of step S550) and when the rotating speed of the main brush does not reach the predetermined rotating speed within the second predetermined time period ("Yes" in the determination of step S570), the electric motor may be restarted (step S580) such that the rotating speed of the main brush can be increased to reach the predetermined rotating speed, thereby improving the cleaning effect.

Figure 6:
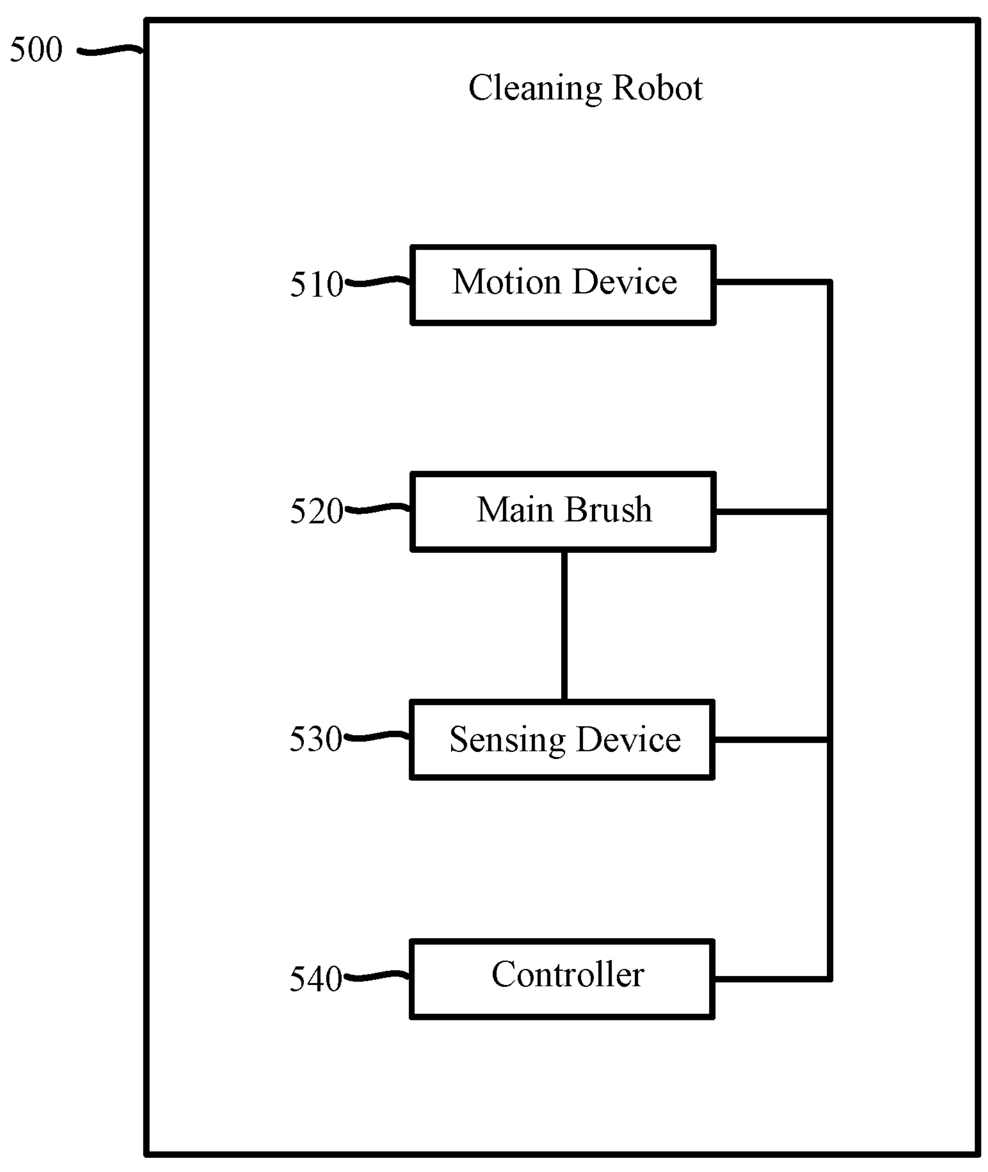
FIG. 6 is a schematic illustration of a cleaning robot, according to an illustrative embodiment of the present disclosure.

FIG. 6 schematically illustrates a cleaning robot 500, according to an illustrative embodiment of the present disclosure. As shown in FIG. 6, the cleaning robot 500 may include a motion device 510, a main brush 520, a sensing device 530, and a controller 540. The motion device 510 may be configured to move the cleaning robot 500 on the surface-to-be-cleaned. The main brush 520 may be configured to clean the surface-to-be-cleaned. The sensing device 530 may be connected with the main brush 520, and may be configured to obtain the rotating speed of the main brush 520. The controller 540 may be electrically connected with the sensing device 530, and may be configured to decrease the rotating speed of the main brush when the rotating speed of the main brush is greater than a predetermined rotating speed; or, to increase the rotating speed of the main brush when the rotating speed of the main brush is less than the predetermined rotating speed.

In an implementation, the predetermined rotating speed is a predetermined rotating speed range, and the controller 540 may also be configured to: increase the rotating speed of the main brush when the rotating speed of the main brush is less than a lower limit of the predetermined rotating speed range, such that the increased rotating speed of the main brush is within the predetermined rotating speed range; or, decrease the rotating speed of the main brush when the rotating speed of the main brush is greater than an upper limit of the predetermined rotating speed range, such that the decreased rotating speed of the main brush is within the predetermined rotating speed range.

In an implementation, the predetermined rotating speed is a predetermined rotating speed value, and the controller 540 may also be configured to: increase the rotating speed of the main brush when the rotating speed of the main brush is less than the predetermined rotating speed value, such that the increased rotating speed of the main brush reaches or is greater than the predetermined rotating speed value; or, decrease the rotating speed of the main brush when the rotating speed of the main brush is greater than the predetermined rotating speed value, such that the decreased rotating speed of the main brush reaches or is less than the predetermined rotating speed value.

Figure 7:
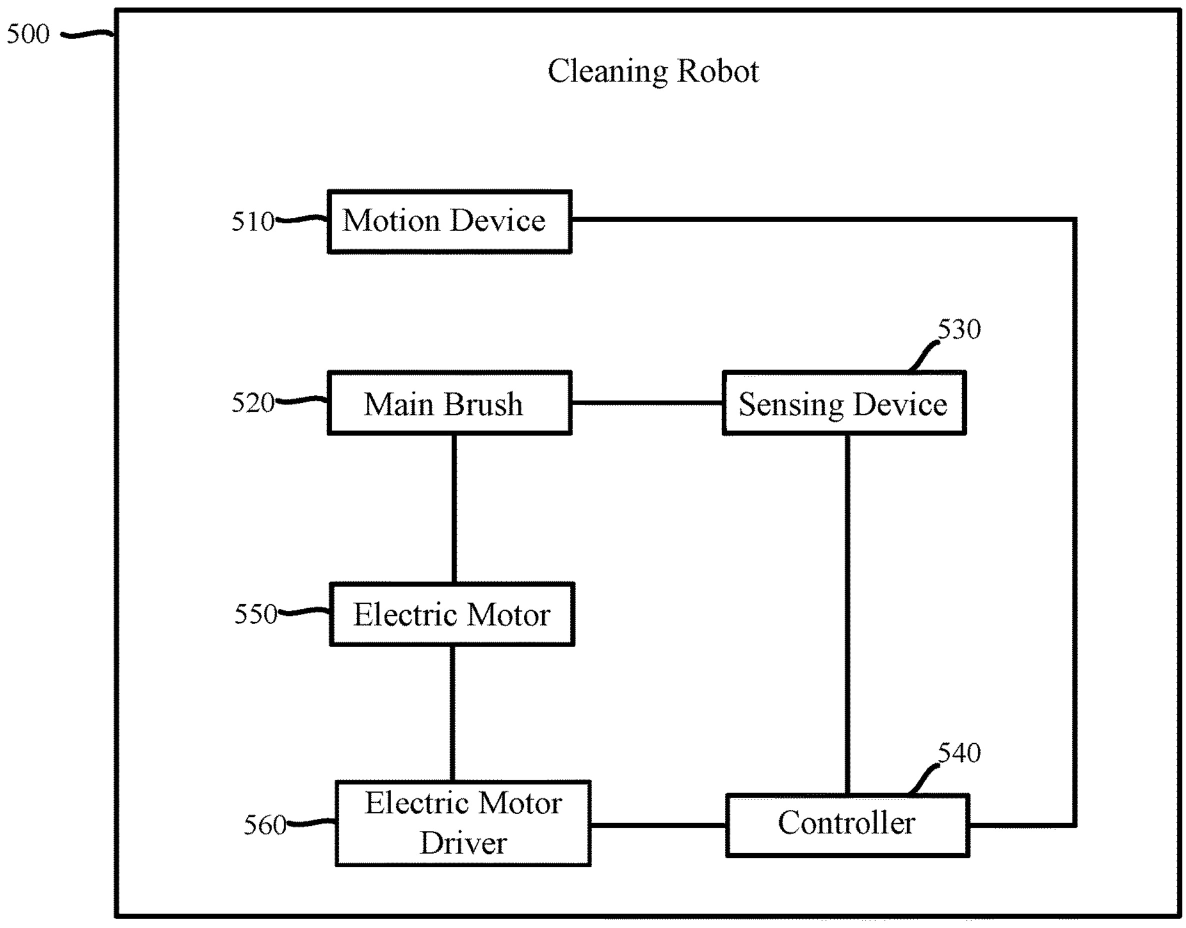
FIG. 7 is a schematic illustration of a cleaning robot, according to an illustrative embodiment of the present disclosure.

FIG. 7 schematically illustrates a cleaning robot according to an illustrative embodiment of the present disclosure. As shown in FIG. 7, the cleaning robot 500 may also include an electric motor 550 and an electric motor driver 560. The electric motor 550 may be connected with the main brush 520, and may be configured to drive the main brush 520 to rotate. The electric motor driver 560 may be electrically connected with the electric motor 550, and may be configured to drive the electric motor 550.

In an implementation, the controller 540 may also be configured to: when the rotating speed of the main brush is greater than the predetermined rotating speed, control the electric motor driver 560 to supply a reduced electrical signal to the electric motor 550, to reduce the torque output from the electric motor 550, thereby decreasing the rotating speed of the main brush to the predetermined rotating speed; or, when the rotating speed of the main brush is less than the predetermined rotating speed, to control the electric motor driver 560 to supply an increased electrical signal to the electric motor 550, to increase the torque output from the electric motor 550, thereby increasing the rotating speed of the main brush to the predetermined rotating speed.

In an implementation, the controller 540 may also be configured to: monitor whether a relevant electrical signal at the electric motor 550 exceeds a predetermined electrical signal threshold; when the relevant electrical signal exceeds the predetermined electrical signal threshold, output an alarm signal indicating over-current and/or stop the rotation of the electric motor 550 within a predetermined time period.

In an implementation, the controller 540 may also be configured to: monitor whether a relevant electrical signal at the electric motor 550 exceeds a predetermined electrical signal threshold within a first predetermined time period; when the relevant electrical signal exceeds the predetermined electrical signal threshold within the first predetermined time period, output an alarm signal and/or stop the rotation of the electric motor 550 within a predetermined time period.

In an implementation, the controller 540 may also be configured to: when the relevant electrical signal does not exceed the predetermined electrical signal threshold within the first predetermined time period and the rotating speed of the main brush does not reach the predetermined rotating speed within a second predetermined time period, restart the electric motor 550.

In the above various implementations, when the rotating speed of the main brush satisfies certain conditions, the current operation state may be maintained without any change.

In the above various implementations, the predetermined rotating speed may be a pre-stored parameter, or may be a real time value obtained through calculation based on the real time operation data of the cleaning robot and certain computation rules.

For the devices described in the above embodiments, the detailed operations of each component have been described in detail in the relevant method embodiments, which are not repeated.

Figure 12:
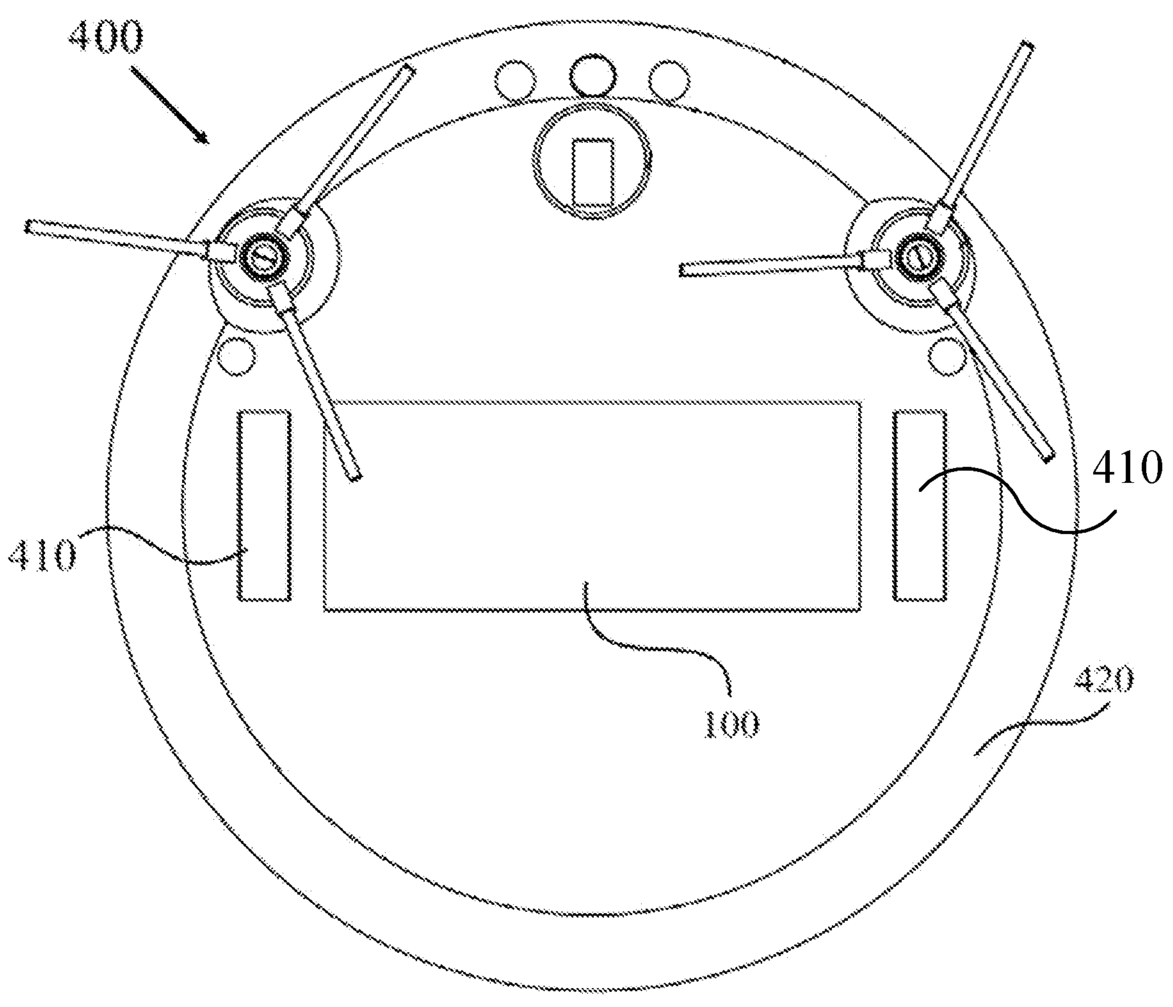
FIG. 12 is a schematic diagram showing a cleaning robot according to an illustrative embodiment of the present disclosure.

FIG. 12 is a schematic diagram of a cleaning robot 400 according to an illustrative embodiment of the present disclosure. It is noted that the same structure may also apply to any cleaning robot shown in other figures (e.g., the cleaning robot 500 shown in FIG. 6) or described in this specification. The cleaning robot 400 may include a housing 420, a motion device 410, and a main brush assembly 100. The motion device 410 may be configured to move the cleaning robot 400 on a surface-to-be-cleaned. The main brush assembly 100 may be disposed at a bottom portion of the cleaning robot 100 (the disposition manner is not shown). As such, the cleaning robot 400 may move on the surface-to-be-cleaned through the motion device 410 and clean the surface-to-be-cleaned by a main brush of the main brush assembly 100 (the main brush being controlled by the main brush assembly 100).

The cleaning robot 400 may be, for example, a device configured to autonomously move in a space of an actual work zone to clean trash (e.g., dust, dirty water, etc.) on a floor or a window, thereby autonomously cleaning the space. The cleaning robot 400 may include, but is not limited to, a smart floor sweeping robot, a smart floor mopping robot, a window cleaning robot. The space of the actual work zone of the cleaning robot 400 may be a closed space formed by a plurality of rooms, or may be an open space such as an outdoor space. In other words, the cleaning robot 400 may be configured to clean an indoor space of a home to be cleaned, and the cleaning robot 400 may be configured to clean an outdoor space to be cleaned, such as a floor/ground of a public square.

Figure 13:
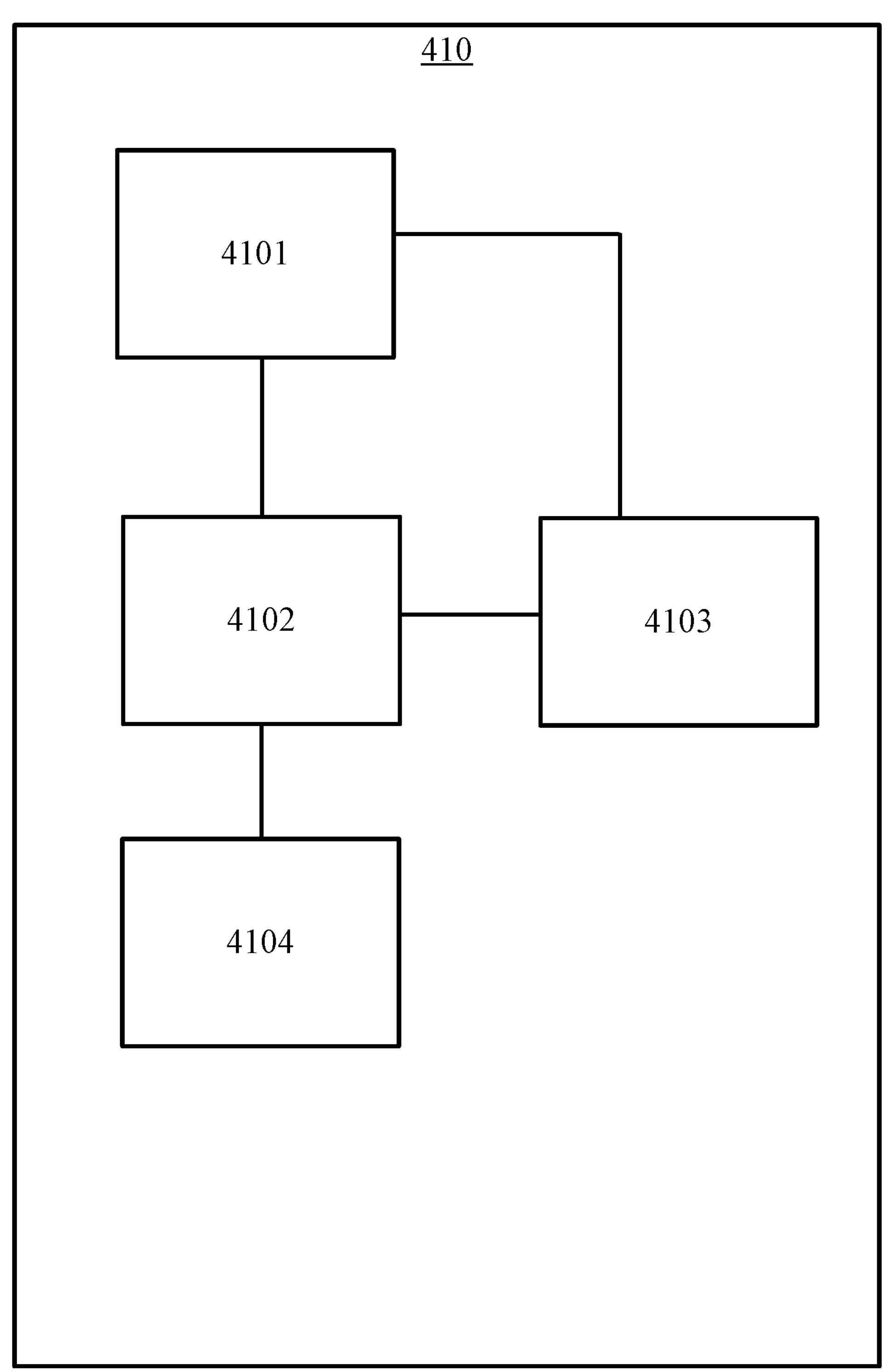
FIG. 13 is a schematic diagram showing the structure of a motion device included in the cleaning robot, according to an illustrative embodiment of the present disclosure.

FIG. 13 is a schematic diagram showing the structure of a motion device included in the cleaning robot, according to an illustrative embodiment of the present disclosure. For illustrative purposes, the motion device shown in FIG. 13 uses the motion device 410 as an example. It is understood that the structure of the motion device may apply to any motion device mentioned in the present disclosure, such as the motion device 510 shown in FIG. 7. As shown in FIG. 13, the motion device 410 may include: a wheel assembly 4101, a wheel assembly electric motor 4102 that is connected with the wheel assembly 4101 and configured to drive the wheel assembly 4101, a wheel assembly decelerator 4103 that is connected with the wheel assembly electric motor 4102 and the wheel assembly 4101 and is configured to change the torque output by the wheel assembly electric motor 4102 such that the wheel assembly electric motor 4102 changes the rotating speed of the wheel assembly 4101, and a wheel assembly electric motor driver 4104 that is connected to the wheel assembly electric motor 4102 and is configured to drive the wheel assembly electric motor 4102. For illustrative purposes, the wheel assembly 4101 shown in FIG. 12 includes two driving wheels 410 disposed at two side positions of the chassis of the cleaning robot 400.

It should be understood that the cleaning robot 400 may adopt a suitable housing and a suitable motion device known in the art as the housing 420 and the motion device 410. Due to the space limitation, the present disclosure does not provide a detailed description of the detailed structures of the housing 420 and the motion device 410. Finally, it is understood that although different numerical numbers may have been used to refer to the cleaning robot (e.g., cleaning robot 400, cleaning robot 500), these numbers are merely used for illustrative purposes. The structures described in connection with one cleaning robot represented by a specific reference number may apply to the cleaning robot represented by another specific reference number.

Figure 8:
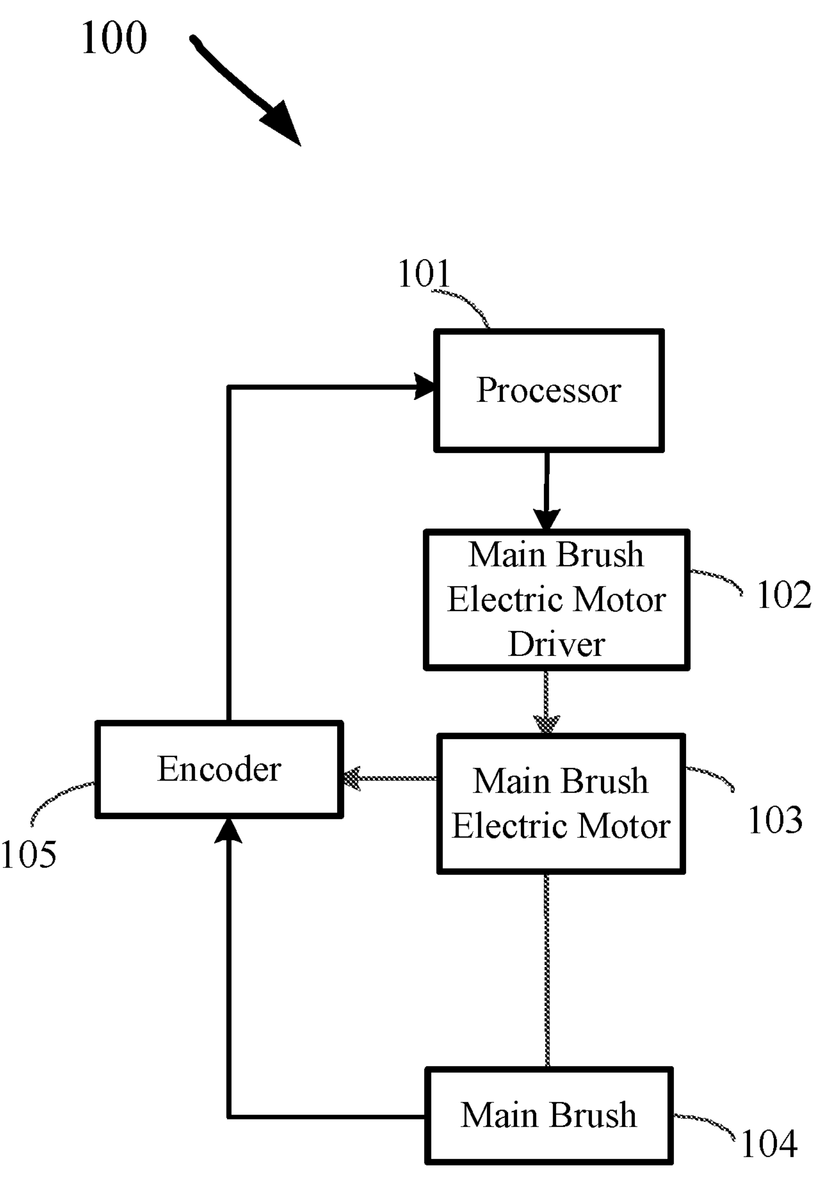
FIG. 8 is a schematic diagram of a main brush assembly of a cleaning robot, according to an illustrative embodiment of the present disclosure.

FIG. 8 is a schematic diagram of a main brush assembly 100 according to an illustrative embodiment of the present disclosure. It is understood that the structures of the main brush assembly 100 shown in FIGS. 8-11 may apply to any main brush shown in other figures or mentioned in other places that includes a main brush assembly. The main brush assembly 100 may include a processor 101, a main brush electric motor driver 102, a main brush electric motor 103, a main brush 104, and an encoder 105. The main brush 104 may be configured to clean a surface-to-be-cleaned. The main brush electric motor 103 may be connected to the main brush 104, and configured to drive the main brush 104 to rotate. The main brush electric motor driver 102 may be connected to the main brush electric motor 103, and configured to drive the main brush electric motor 103. The encoder 105 may be disposed at (e.g., on) the main brush electric motor 103 and configured to monitor the rotating speed of the main brush 104, and transmit a feedback signal including the rotating speed of the main brush 104 to the processor 101. The processor 101 may be electrically connected to the encoder 105 and the main brush electric motor driver 102, and configured to receive the feedback signal from the encoder 105 and transmit an instruction signal to the main brush electric motor driver 102. The main brush electric motor driver 102 may adjust the rotating speed of the main brush electric motor 103 based on the instruction signal.

In the illustrative embodiment, the surface-to-be-cleaned may be any surface in the space of the actual work zone of the cleaning robot 400. The main brush 104 may rotate when driven by the main brush electric motor 103 to clean the surface-to-be-cleaned. That is, the main brush electric motor 103 may provide the power needed for the rotation of the main brush 104. It should be understood that the main brush 104 may be detachable, and may be realized using any suitable structures known in the art. The present disclosure does not limit the amount of the main brush 104 and the placements.

The processor 101 may be disposed on an electrical circuit board within the housing of the cleaning robot 400. The processor 101 may be realized using one or more of an application-specific integrated circuit (ASIC), a micro control unit (MCU), a digital signal processor (DSP), a digital signal processing device (DSPD), a programmable logic device (PLD), a field-programmable gate array (FPGA), or other electronic components. Under the control of the processor 101, the main brush electric motor driver 102 may control the main brush electric motor 103, thereby controlling the rotating speed of the main brush 104. Specifically, the main brush electric motor driver 102 may receive, from the processor 101, an instruction signal that is configured for instructing the main brush electric motor driver 102 to control the rotating speed of the main brush electric motor 103, and may control a rotating speed of the electric motor 103 based on the received instruction signal, thereby controlling the rotating speed of the main brush 104.

Illustratively, the encoder 105 may be disposed at the main brush electric motor 103. The encoder 105 may be configured to rotate coaxially with the main brush electric motor 103. Thus, the encoder 105 may rotate along with the main brush electric motor 103. Accordingly, the encoder 105 may monitor the rotating speed of the main brush electric motor 103, thereby monitoring the rotating speed of the main brush 104 that is driven by the main brush electric motor 103. In other words, a signal relating to the rotating speed of the main brush 104 may be communicated between the encoder 105 and the main brush 104. The present disclosure does not limit the placement of the encoder 105. In some embodiments, the encoder 105 may not rotate coaxially with the main brush electric motor 103. For example, a belt may be used to make the shaft of the main brush electric motor 103 to be parallel with the shaft of the encoder 105. Alternatively, through a worm wheel and worm gear mechanism or a bevel gear, the shaft of the main brush electric motor 103 and the shaft of the encoder 105 may form a predetermined angle. The above methods can all enable the encoder 105 to monitor the rotating speed of the main brush electric motor 103. Therefore, the present disclosure does not limit the relative positions of the main brush electric motor 103 and the encoder 105.

In some embodiments, the encoder 105 may be electrically connected with the processor 101. Thus, the encoder 105 may be configured to transmit a feedback signal including the rotating speed of the main brush 104 to the processor 101. The processor 101 may calculate the rotating speed of the main brush 104 based on a pertinent algorithm in the art and based on the feedback signal, may generate the instruction signal based on the calculated rotating speed of the main brush 104, and may transmit the instruction signal to the main brush electric motor driver 102 that is electrically connected with the processor 101, thereby adjusting the rotating speed of the main brush electric motor 103, and further thereby adjusting the rotating speed of the main brush 104.

Thus, the processor 101 may obtain the rotating speed of the main brush 104 through the encoder 105 that is electrically connected with the processor 101, and may output the instruction signal configured for adjusting the rotating speed of the main brush electric motor 103 to the main brush electric motor driver 102. Correspondingly, the main brush electric motor driver 102 may receive the instruction signal from the processor 101, and may adjust the rotating speed of the main brush electric motor 103 based on the received instruction signal, thereby adjusting the rotating speed of the main brush 104 that is driven by the main brush electric motor 103.

As such, when there is a need to adjust the rotating speed of the main brush 104, the rotating speed of the main brush 104 may be adjusted using the above-described rotating speed adjustment method. Therefore, the cleaning effect of the cleaning robot 400 may be maintained, thereby satisfying the cleaning needs of the cleaning robot 400. In addition, power consumption of the cleaning robot 400 may be reduced, thereby increasing the operation time of the cleaning robot 400. User experience may be improved.

Therefore, according to the cleaning robot 400 and the main brush assembly 100 of the present disclosure, the encoder 105 may monitor the rotating speed of the main brush 104, and may transmit a feedback signal including the rotating speed of the main brush 104 to the processor 101. The processor 101 may receive the feedback signal from the encoder 105 and output an instruction signal to the main brush electric motor driver 102. The main brush electric motor driver 102 may receive the instruction signal from the processor 101, and adjust the rotating speed of the main brush electric motor 103 based on the instruction signal, thereby adjusting the rotating speed of the main brush 104.

Illustratively, when the cleaning robot 400 moves to an area/location to be cleaned that has a greater friction, the rotating speed of the main brush 104 may change. For example, the rotating speed of the main brush 104 may decrease when affected by the friction. The decreased rotating speed may not satisfy the current cleaning needs (e.g., the excessively slow rotating speed may cause a degradation in the cleaning effect for this area and/or an extension of the cleaning time needed for cleaning this area to be cleaned). Under such circumstances, the main brush assembly 100 of the cleaning robot 400 may increase the rotating speed of the main brush 104 using the above-described method, thereby satisfying the current cleaning needs (maintaining the same cleaning effect by maintaining the rotating speed of the main brush to be the predetermined rotating speed).

Illustratively, when the cleaning robot 400 moves to an area/location to be cleaned that is relatively smoother, the rotating speed of the main brush 104 may increase. Under such circumstances, although the cleaning effect is maintained, the power consumption by the cleaning robot 400 may be unnecessarily increased, which may reduce the operation time of the cleaning robot 400. To address this issue, the main brush assembly 100 of the cleaning robot 400 may reduce the rotating speed of the main brush 104 using the above-described method, to reduce the power consumption by the cleaning robot 400, thereby increasing the operation time of the cleaning robot 400.

Figure 9:
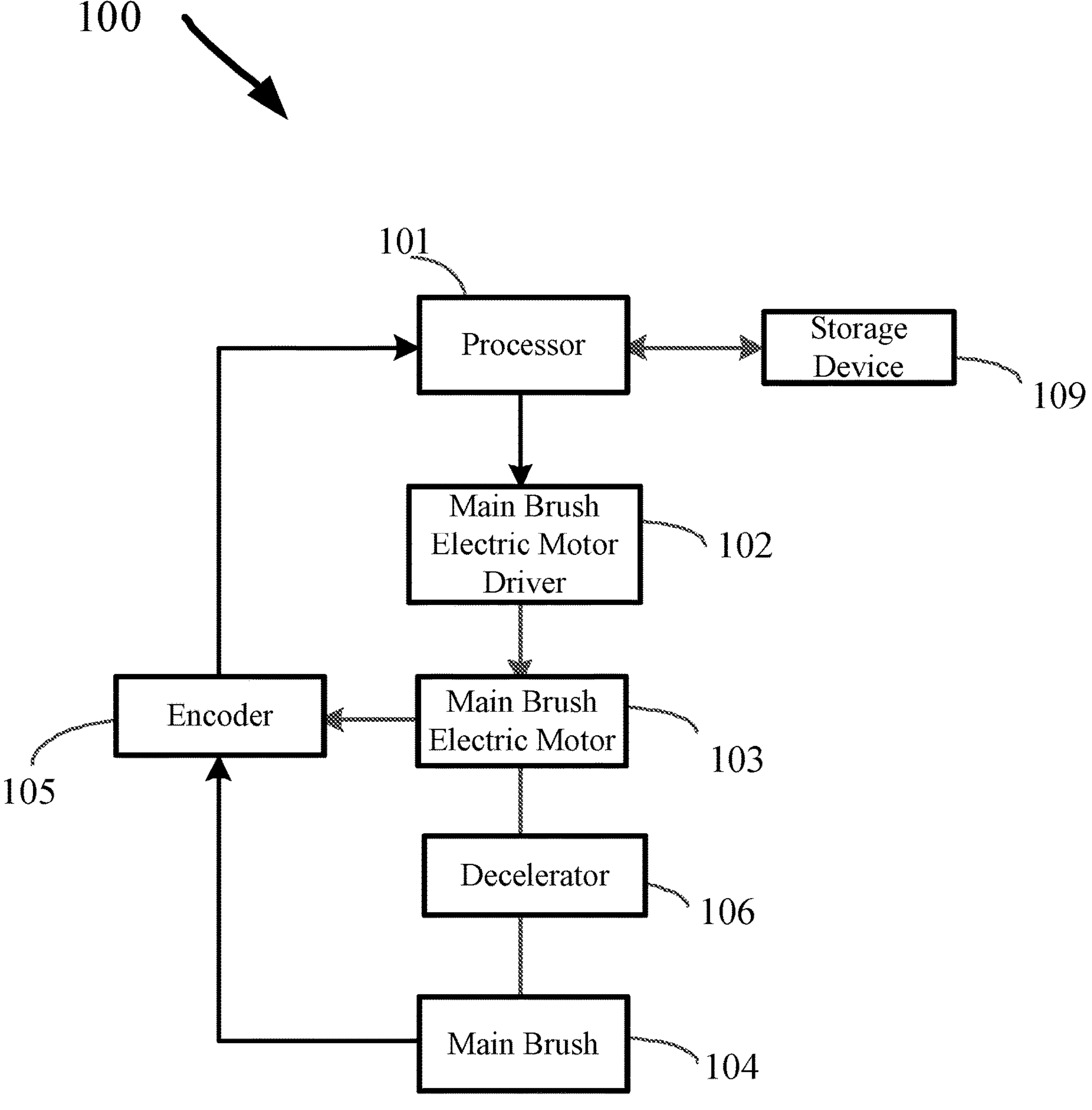
FIG. 9 is a schematic diagram of a main brush assembly of a cleaning robot, according to another illustrative embodiment of the present disclosure.

FIG. 9 is a schematic diagram of the main brush assembly 100 according to an illustrative embodiment of the present disclosure. In addition to the elements shown in FIG. 8 (the descriptions of which are not repeated here), the main brush assembly 100 shown in FIG. 9 may further include a storage device 109. The storage device 109 may be configured to store instructions and data. The data may include, but not be limited to, map data, temporary data generated during the operation of the cleaning robot 400 (e.g., the location data, speed data, mileage data of the cleaning robot 400), the rotating speed of the main brush 104, the correspondence relationship data between the rotating speed of the main brush 104 and the instruction signal that is configured for adjusting the rotating speed of the main brush electric motor 103, etc. The storage device 109 may include, but not be limited to, a random access memory (RAM), a read-only memory (ROM), a hard disk driver (HDD), etc.

In some embodiments, the processor 101 may be configured to retrieve the instructions stored in the storage device 109 to execute the corresponding functions. In some embodiments, the processor 101 may retrieve the relevant instructions storage in the storage device 109 to calculate the rotating speed of the main brush 104 based on the feedback signal received from the encoder 105. In some embodiments, the processor 101 may retrieve the correspondence relationship data, which are stored in the storage device 109, between the rotating speed of the main brush 104 and the instruction signal configured for adjusting the rotating speed of the main brush electric motor 103, may obtain instruction signal corresponding to the calculated rotating speed of the main brush 104, and may transmit the instruction signal to the main brush electric motor driver 102.

In one implementation, the processor 101 may compare the rotating speed of the main brush 104 included in the feedback signal received from the encoder 105 with the predetermined rotating speed (the predetermined rotating speed may be pre-stored in the storage device 109, or may be calculated in real time based on the real time operation data of the cleaning robot and predetermined rules), and may output an instruction signal corresponding to a result of the comparison to the main brush electric motor driver 102. The predetermined rotating speed may be a predetermined rotating speed value or a predetermined rotating speed range.

In some embodiments, the processor 101 may retrieve pertinent instructions from the storage device 109 to compare the rotating speed of the main brush 104 and the predetermined rotating speed, and may output the instruction signal corresponding to the result of comparison to the main brush electric motor driver 102.

Illustratively, the storage device 109 may store the following instructions: comparing the rotating speed of the main brush with the predetermined rotating speed value, and if the rotating speed of the main brush is less than the predetermined rotating speed value, outputting an instruction signal for increasing the rotating speed of the main brush. Under this circumstance, the processor 101 may retrieve the above-described instruction stored in the storage device 109, compare the rotating speed of the main brush 104 with the predetermined rotating speed value, and when the rotating speed of the main brush 104 is less than the predetermined rotating speed value, output the instruction signal for increasing the rotating speed of the main brush electric motor 103 to the main brush electric motor driver 102. Correspondingly, the main brush electric motor driver 102 may receive the instruction signal from the processor 101, and may adjust the torque output from the main brush electric motor 103 based on the received instruction signal, thereby increasing the rotating speed of the main brush 104 that is driven by the main brush electric motor 103. As such, when the rotating speed of the main brush 104 is less than the predetermined rotating speed value, the rotating speed of the main brush 104 may be increased using the above-described method. Therefore, the same cleaning effect may be maintained by maintaining the rotating speed of the main brush at the predetermined rotating speed value.

Illustratively, the storage device 109 may also store the following instructions: comparing the rotating speed of the main brush with the predetermined rotating speed value; outputting an instruction signal for decreasing the rotating speed of the main brush when the rotating speed of the main brush is greater than the predetermined rotating speed value. Under such circumstances, the processor 101 may retrieve the above-described instruction stored in the storage device 109, compare the rotating speed of the main brush 104 with the predetermined rotating speed value, and output an instruction signal for decreasing the rotating speed of the main brush electric motor 103 to the main brush electric motor driver 102 when the rotating speed of the main brush 104 is greater than the predetermined rotating speed value. Correspondingly, the main brush electric motor driver 102 may receive the instruction signal from the processor 101, and adjust the torque output from the main brush electric motor 103 based on the received instruction signal, thereby decreasing the rotating speed of the main brush 104 that is driven by the main brush electric motor 103. As such, when the rotating speed of the main brush 104 is greater than the predetermined rotating speed value, the rotating speed of the main brush 104 may be decreased using the above-described method. As a result, power consumption by the cleaning robot 400 may be reduced, thereby increasing the operation time of the cleaning robot 400.

Illustratively, the storage device 109 may also store the following instructions: determining whether the rotating speed of the main brush exceeds a predetermined rotating speed range; and outputting an instruction signal configured for causing the rotating speed of the main brush to fall within the predetermined rotating speed range when the rotating speed of the main brush exceeds the predetermined rotating speed range. Under such circumstances, the processor 101 may retrieve the above-described instructions from the storage device 109, determine whether the rotating speed of the main brush 104 exceeds the predetermined rotating speed range, and output the instruction signal configured for adjusting the rotating speed of the main brush electric motor 103 to the main brush electric motor driver 102 when the rotating speed of the main brush 104 exceeds the predetermined rotating speed range. Correspondingly, the main brush electric motor driver 102 may receive the instruction signal from the processor 101, and may adjust the torque output from the main brush electric motor 103 based on the received instruction signal, thereby causing the rotating speed of the main brush 104 that is driven by the main brush electric motor 103 to fall within the predetermined rotating speed range. As such, when the rotating speed of the main brush 104 does not fall within the predetermined rotating speed range, the above-described methods may be used to increase/decrease the rotating speed of the main brush 104 such that the rotating speed of the main brush 104 falls within the predetermined rotating speed range. As a result, the cleaning effect of the cleaning robot 400 may be maintained (the same cleaning effect as that when the rotating speed of the main brush falls within the predetermined rotating speed range may be maintained), thereby satisfying the cleaning need of the cleaning robot 400. In addition, power consumption by the cleaning robot 400 may be reduced, thereby increasing the operation time of the cleaning robot 400.

Figure 10:
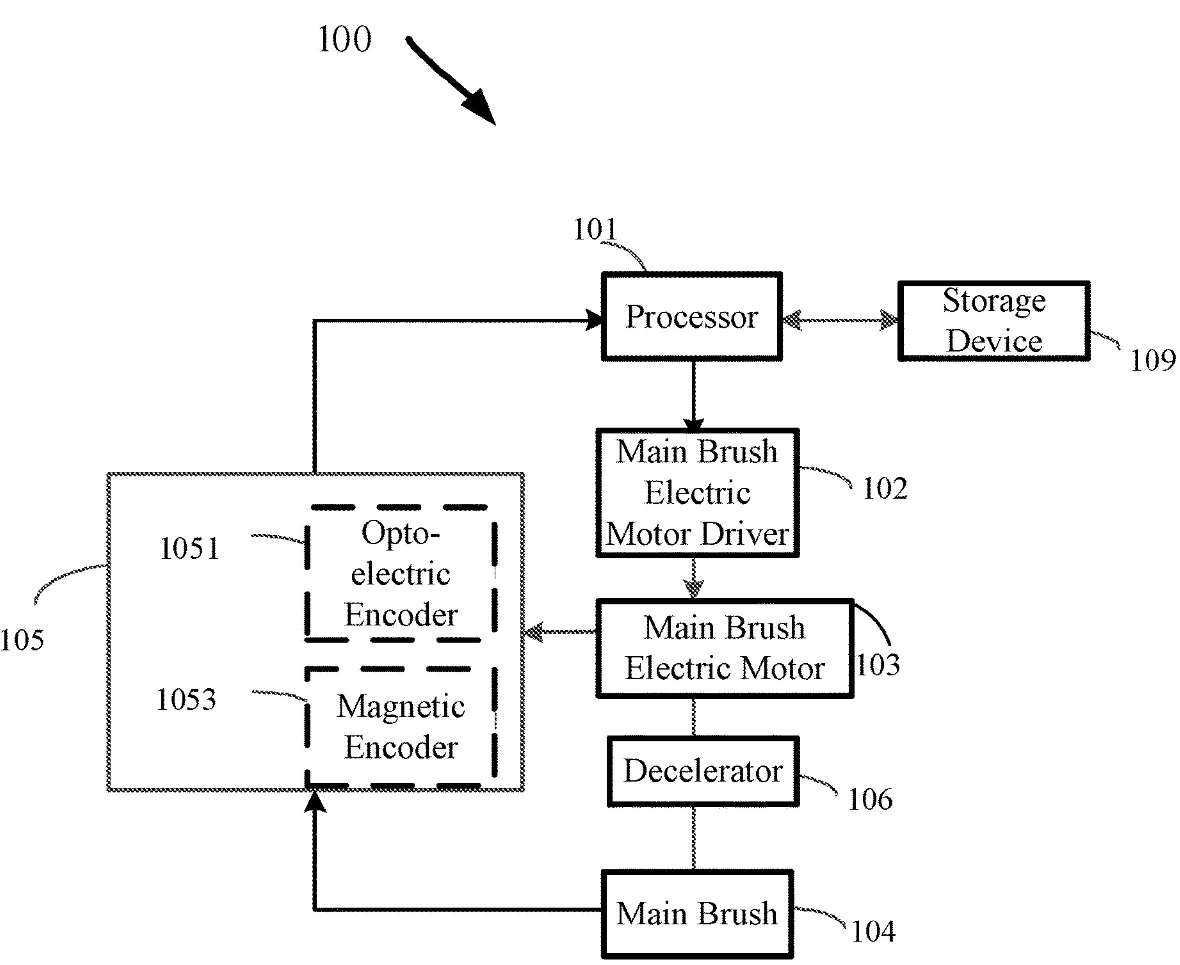
FIG. 10 is a schematic diagram showing detailed components included in the encoder of the main brush assembly shown in FIG. 9, according to an illustrative embodiment of the present disclosure.

Still referring to FIG. 9, the main brush assembly 100 may also include a decelerator 106. The decelerator 106 may be connected with the main brush electric motor 103 and the main brush 104, and may be configured to change the torque output from the main brush electric motor 103. In some embodiments, the power input end of the decelerator 106 may be connected with the main brush electric motor 103, and the power output end of the decelerator 106 may be connected with the main brush 104. The decelerator 106 may adjust the torque (power) transmitted from the main brush electric motor 103, and transmit the adjusted torque to the main brush 104, thereby adjusting the rotating speed of the main brush 104. FIG. 10 is a schematic diagram showing the detailed components of the encoder 105 shown in FIG. 9, according to an illustrative embodiment of the present disclosure. It is noted that although the detailed components of the encoder 105 are shown using the embodiment of FIG. 9, it is understood that the detailed components of the encoder 105 may apply to any other figures where the encoder 105 is shown, such as FIG. 8, or other places in the descriptions where the encoder is mentioned. Referring to FIG. 10, the encoder 105 may include an opto-electric encoder 1051. The above-described encoder may be, for example, E6B2-CWZ6C opto-electric rotary incremental encoder, etc. In some embodiments, the rotating speed of the main brush 104 may be monitored by the opto-electric encoder 1051, which may transmit a feedback signal including the rotating speed of the main brush 104 to the processor 101. Correspondingly, the processor may control the rotating speed of the main brush 104 based on the above-described methods. Continuing to refer to FIG. the encoder 105 may also include a magnetic encoder 1053, such as a YC2010-31 brushless electric motor incremental Hall magnetism-sensitive encoder or a QY1503-SPI type mini-encoder, etc. In some embodiments, the rotating speed of the main brush 104 may be monitored by the magnetic encoder 1053, which may transmit a feedback signal including the rotating speed of the main brush 104 to the processor 101. Correspondingly, the processor 101 may control the rotating speed of the main brush 104 using the above-described methods.

Figure 11:
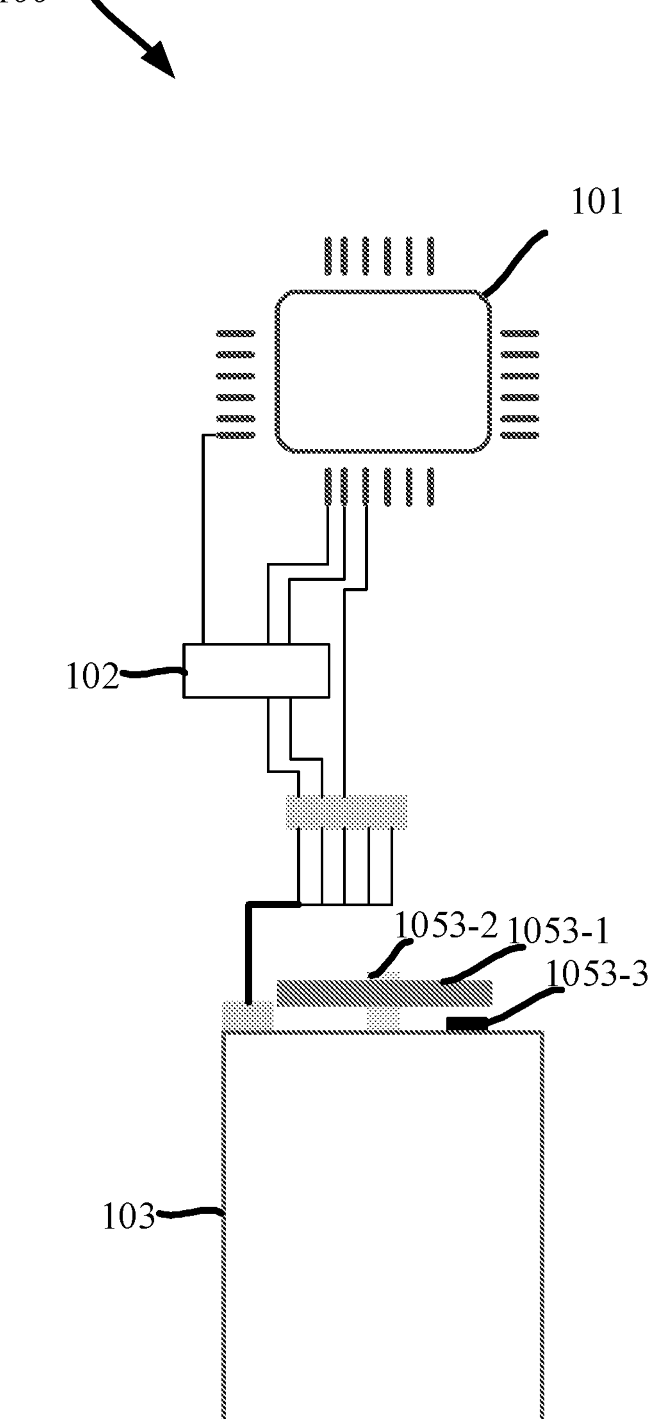
FIG. 11 is a schematic diagram showing the structure of the main brush assembly shown in FIG. 8 when a magnetic encoder is included, according to an illustrative embodiment of the present disclosure.

FIG. 11 is a schematic diagram showing the main brush assembly 100 shown in FIG. 8, according to an illustrative embodiment of the present disclosure. FIG. 11 shows the detailed components of the encoder 105, when the encoder 105 includes the magnetic encoder 1053. Thus, FIG. 11 shows the detailed components of the magnetic encoder 1053. It is noted that although the detailed components of the magnetic encoder 1053 is shown in FIG. 11 using the configuration of the main brush assembly 100 shown in FIG. 8 as an example, the detailed components/structures of the magnetic encoder 1053 also apply to the embodiment shown in FIG. 9, when the encoder 105 includes the magnetic encoder 1053, or FIG. 10. In addition, the detailed components of the magnetic encoder 1053 may apply to other figures where the encoder 105 is shown or other places in the descriptions where the encoder is mentioned. Referring to FIG. 11, the magnetic encoder 1053 may include a encoder magnetic disk 1053-1, an encoder shaft 1053-2, and a Hall sensor 1053-3. The encoder magnetic disk 1053-1 may be formed by a plurality of alternately arranged N/S poles (N represents the north pole of the magnetic field, S represents the south pole of the magnetic field). In some embodiments, the encoder shaft 1053-2 may rotate coaxially with the shaft of the main brush electric motor 103, to cause the encoder magnetic disk 1053-1 to rotate, and the Hall sensor 1053-3 may output a pulse signal corresponding to the rotating speed of the main brush 104. Other methods mentioned in above embodiments may be used. For example, the encoder shaft may not be coaxial with the main brush electric motor using the belt, a worm wheel and worm gear mechanism, or a bevel gear, as described above. In some embodiments, the Hall sensor 1053-3 may output a pulse signal corresponding to the rotating speed of the main brush 104 to the processor 101. The pulse signal may correspond to the feedback signal that includes the rotating speed of the main brush 104. The processor 101 may control the rotating speed of the main brush 104 using the above-described methods.

It should be noted that the opto-electric sensor performs detection based on sensing of lights. However, the working environment of the cleaning robot often has a lot of dust. The dust may accumulate on the cleaning robot over time when the cleaning robot operates in such an environment, which may affect the determination by the opto-electric sensor. Therefore, the Hall sensor may be used. The Hall sensor performs sensing based on magnetism, which is not affected by the dust. Therefore, the Hall sensor can maintain sensing accuracy during operation in a relatively longer time period.

Illustratively, even when the rotating speed of the main brush 104 is within the predetermined rotating speed range, the processor 101 may still output an instruction signal configured for maintaining the current rotating speed of the main brush electric motor 103 to the main brush electric motor driver 102. Correspondingly, the rotating speed of the main brush 104 may be maintained as constant without any change (i.e., the rotating speed of the main brush 104 need not be changed). It should be noted that that in the present disclosure, adjusting the rotating speed of the main brush electric motor also includes maintaining the rotating speed of the main brush electric motor, in a broad sense. Similarly, even when the rotating speed of the main brush 104 equals the predetermined rotating speed value, the processor 101 may still output an instruction signal configured for maintaining the current rotating speed of the main brush electric motor 103 to the main brush electric motor driver 102. Correspondingly, the rotating speed of the main brush 104 may be maintained as constant without any change (i.e., the rotating speed of the main brush 104 need not be changed).

In other words, in some embodiments, the processor 101 may be configured to output an instruction signal to the main brush electric motor driver 102 regardless of the relationship between the rotating speed of the main brush 104 and the predetermined rotating speed value, and regardless of whether the rotating speed of the main brush 104 falls within the predetermined rotating speed range. The difference is in the detailed content of the instruction signal. In some embodiments, when the rotating speed of the main brush 104 equals the predetermined rotating speed value or the rotating speed of the main brush 104 falls within the predetermined rotating speed range, the processor 101 may be configured to not output an instruction signal to the main brush electric motor driver 102.

The above described are various specific embodiments of the present disclosure. The present disclosure is not limited to the described embodiments. Within the scope of the technical solution disclosed in the present disclosure, many modifications and substitutions are easy to be conceived by a person having ordinary skills in the art. Such modification or substitutions are also within the scope of protection of the present disclosure. Therefore, the scope of protection of the present disclosure is defined by the scope of protection described in the claims.

What is claimed is:

1. A method for controlling a rotating speed of a main brush of a cleaning robot, comprising:

obtaining the rotating speed of the main brush when the main brush cleans a surface-to-be-cleaned;

comparing the rotating speed of the main brush with a predetermined rotating speed;

when the rotating speed of the main brush is less than the predetermined rotating speed, controlling an electric motor driver of an electric motor of the main brush to increase an electrical signal supplied to the electric motor, to increase the rotating speed of the main brush to the predetermined rotating speed;

monitoring whether a relevant electrical signal at the electric motor of the main brush exceeds a predetermined electrical signal threshold within a first predetermined time period;

when the relevant electrical signal at the electric motor of the main brush exceeds the predetermined electrical signal threshold within the first predetermined time period, outputting the alarm signal indicating over-current and/or stopping the electric motor within a predetermined time period; and when the relevant electrical signal does not exceed the predetermined electrical signal threshold within the first predetermined time period, determining whether the rotating speed of the main brush reaches the predetermined rotating speed within a second predetermined time period, and when it is determined that the rotating speed of the main brush does not reach the predetermined rotating speed within the second predetermined time period, restarting the electric motor.

2. The method for controlling the rotating speed according to claim 1, wherein the predetermined rotating speed is a predetermined rotating speed range, wherein when the rotating speed of the main brush is less than a lower limit of the predetermined rotating speed range, the rotating speed of the main brush is increased to be within the predetermined rotating speed range.

3. The method for controlling the rotating speed according to claim 1, wherein the predetermined rotating speed is a predetermined rotating speed value, wherein when the rotating speed of the main brush is less than the predetermined rotating speed value, the rotating speed of the main brush is increased to reach or to be greater than the predetermined rotating speed value.

4. A cleaning robot, comprising:

a housing;

a motion device configured to move the cleaning robot on a surface-to-be-cleaned; and a main brush assembly disposed at a bottom portion of the cleaning robot, comprising:

a main brush configured to clean a surface-to-be-cleaned;

a main brush electric motor connected with the main brush and configured to drive the main brush to rotate;

a main brush electric motor driver connected with the main brush electric motor and configured to drive the main brush electric motor;

a processor; and an encoder disposed at the main brush electric motor, and configured to monitor a rotating speed of the main brush, and transmit a feedback signal including the rotating speed of the main brush to the processor, wherein the processor is electrically connected with the encoder and the main brush electric motor driver, and is configured to receive the feedback signal from the encoder, and output an instruction signal to the main brush electric motor driver, and wherein the main brush electric motor driver is configured to adjust the rotating speed of the main brush, and wherein the main brush cleans the surface-to-be-cleaned when the motion device moves the cleaning robot on the surface-to-be-cleaned, and wherein the processor is configured to perform a method for controlling the rotating speed of the main brush of the cleaning robot, the method comprising:

obtaining the rotating speed of the main brush when the main brush cleans the surface-to-be-cleaned;

comparing the rotating speed of the main brush with a predetermined rotating speed;

when the rotating speed of the main brush is less than the predetermined rotating speed, controlling an electric motor driver of an electric motor of the main brush to increase an electrical signal supplied to the electric motor, to increase the rotating speed of the main brush to the predetermined rotating speed;

monitoring whether a relevant electrical signal at the electric motor of the main brush exceeds a predetermined electrical signal threshold within a first predetermined time period;

when the relevant electrical signal at the electric motor of the main brush exceeds the predetermined electrical signal threshold within the first predetermined time period, outputting an alarm signal indicating over-current and/or stopping the electric motor within a predetermined time period; and when the relevant electrical signal does not exceed the predetermined electrical signal threshold within the first predetermined time period, determining whether the rotating speed of the main brush reaches the predetermined rotating speed within a second predetermined time period, and when it is determined that the rotating speed of the main brush does not reach the predetermined rotating speed within the second predetermined time period, restarting the electric motor.

5. The cleaning robot according to claim 4, wherein the motion device comprises:

a wheel assembly;

a wheel assembly electric motor connected with the wheel assembly and configured to drive the wheel assembly;

a wheel assembly decelerator connected with the wheel assembly electric motor and the wheel assembly, and configured to change a torque output from the wheel assembly electric motor such that the wheel assembly electric motor changes a rotating speed of the wheel assembly; and a wheel assembly electric motor driver connected with the wheel assembly electric motor and configured to drive the wheel assembly electric motor.

6. The cleaning robot according to claim 4, wherein the main brush assembly further comprises:

a decelerator connected with the main brush electric motor and the main brush, and configured to change a torque output from the main brush electric motor.

7. The cleaning robot according to claim 4, wherein the predetermined rotating speed is a predetermined rotating speed value or a predetermined rotating speed range.

8. The cleaning robot according to claim 7, wherein the predetermined rotating speed is the predetermined rotating speed value, wherein the processor is configured to output a first instruction signal when the rotating speed of the main brush is less than the predetermined rotating speed value, and wherein the main brush electric motor driver is configured to adjust the main brush electric motor based on the first instruction signal to increase a torque output from the main brush electric motor to increase the rotating speed of the main brush.

9. The cleaning robot according to claim 8, wherein the processor is configured to output a second instruction signal when the rotating speed of the main brush is greater than the predetermined rotating speed value, wherein the second instruction signal is different from the first instruction signal, and wherein the main brush electric motor driver is configured to: adjust the main brush electric motor based on the second instruction signal to reduce the torque output from the main brush electric motor to decrease the rotating speed of the main brush.

10. The cleaning robot according to claim 7, wherein the predetermined rotating speed is the predetermined rotating speed range, wherein the processor is configured to output a third instruction signal to the main brush electric motor driver when the rotating speed of the main brush included in the feedback signal exceeds the predetermined rotating speed range, and wherein the main brush electric motor driver is configured to adjust a torque output from the main brush electric motor based on the third instruction signal to thereby adjust the rotating speed of the main brush to be within the predetermined rotating speed range.

11. The cleaning robot according to claim 4, wherein the encoder is an opto-electric encoder.

12. The cleaning robot according to claim 4, wherein the encoder is a magnetic encoder including:

an encoder magnetic disk formed by a plurality of alternately arranged N/S poles;

an encoder shaft configured to coaxially rotate with a shaft of the main brush electric motor to drive the encoder magnetic disk to rotate; and a Hall sensor configured to output a pulse signal corresponding to the rotating speed of the main brush.

13. A non-transitory computer-readable storage medium storing computer-executable program instructions, wherein when the computer-executable program instructions are executed by a processor, the processor controls a cleaning robot to perform a method for controlling a rotating speed of a main brush of the cleaning robot, the method comprising:

obtaining the rotating speed of the main brush when the main brush cleans a surface-to-be-cleaned;

comparing the rotating speed of the main brush with a predetermined rotating speed;

when the rotating speed of the main brush is less than the predetermined rotating speed, controlling an electric motor driver of an electric motor of the main brush to increase an electrical signal supplied to the electric motor, to increase the rotating speed of the main brush to the predetermined rotating speed;

monitoring whether a relevant electrical signal at the electric motor of the main brush exceeds a predetermined electrical signal threshold within a first predetermined time period;

when the relevant electrical signal at the electric motor of the main brush exceeds the predetermined electrical signal threshold within the first predetermined time period, outputting an alarm signal indicating overcurrent and/or stopping the electric motor within a predetermined time period; and when the relevant electrical signal does not exceed the predetermined electrical signal threshold within the first predetermined time period, determining whether the rotating speed of the main brush reaches the predetermined rotating speed within a second predetermined time period, and when it is determined that the rotating speed of the main brush does not reach the predetermined rotating speed within the second predetermined time period, restarting the electric motor.

14. The non-transitory computer-readable storage medium according to claim 13, wherein the predetermined rotating speed is a predetermined rotating speed range, wherein when the rotating speed of the main brush is less than a lower limit of the predetermined rotating speed range, the rotating speed of the main brush is increased to be within the predetermined rotating speed range.

15. The non-transitory computer-readable storage medium according to claim 13, wherein the predetermined rotating speed is a predetermined rotating speed value, wherein when the rotating speed of the main brush is less than the predetermined rotating speed value, the rotating speed of the main brush is increased to reach or to be greater than the predetermined rotating speed value.

* * * * *